United States Patent
Mycek et al.

(10) Patent No.: US 10,009,729 B2
(45) Date of Patent: Jun. 26, 2018

(54) SYSTEM AND METHOD FOR MULTI-BEACON INTERACTION AND MANAGEMENT

(71) Applicant: Estimote Polska Sp. z o. o., Cracow (PL)

(72) Inventors: Marcin Mycek, Cracow (PL); Michal Sznajder, Cracow (PL); Grzegorz Krukiewicz-Gacek, Cracow (PL); Lukasz Kostka, Cracow (PL); Jakub Krzych, Cracow (PL)

(73) Assignee: Estimote Polska Sp. z o. o., Krakow (PL)

( * ) Notice: Subject to any disclaimer, the term of this patent is extended or adjusted under 35 U.S.C. 154(b) by 0 days. days.

(21) Appl. No.: 15/829,339

(22) Filed: Dec. 1, 2017

(65) Prior Publication Data
US 2018/0103346 A1  Apr. 12, 2018

Related U.S. Application Data

(63) Continuation of application No. 15/466,680, filed on Mar. 22, 2017, now Pat. No. 9,867,009.

(60) Provisional application No. 62/311,537, filed on Mar. 22, 2016.

(51) Int. Cl.
| | | |
|---|---|---|
| H04W 4/02 | (2018.01) | |
| H04W 52/32 | (2009.01) | |
| H04W 52/02 | (2009.01) | |
| H04W 4/00 | (2018.01) | |
| H04W 48/10 | (2009.01) | |
| G06Q 30/02 | (2012.01) | |

(52) U.S. Cl.
CPC ........ *H04W 4/023* (2013.01); *G06Q 30/0261* (2013.01); *H04W 4/008* (2013.01); *H04W 4/026* (2013.01); *H04W 4/027* (2013.01); *H04W 4/80* (2018.02); *H04W 48/10* (2013.01); *H04W 52/0216* (2013.01); *H04W 52/322* (2013.01)

(58) Field of Classification Search
None
See application file for complete search history.

(56) References Cited

U.S. PATENT DOCUMENTS

| | | |
|---|---|---|
| 6,091,358 A | 7/2000 | Maniscalco et al. |
| 6,873,258 B2 | 3/2005 | Marples et al. |
| 7,027,808 B2 | 4/2006 | Wesby |
| 7,038,584 B2 | 5/2006 | Carter |
| 7,072,671 B2 | 7/2006 | Leitch |
| 7,146,178 B2 | 12/2006 | Lehikoinen et al. |
| 7,283,846 B2 | 10/2007 | Spriestersbach et al. |
| 7,312,752 B2 | 12/2007 | Smith et al. |
| 7,458,825 B2 | 12/2008 | Atsmon et al. |
| 7,499,462 B2 | 3/2009 | MacMullan et al. |

(Continued)

FOREIGN PATENT DOCUMENTS

| | | |
|---|---|---|
| WO | 21429 | 3/2002 |
| WO | 021429 | 3/2003 |

(Continued)

*Primary Examiner* — Alejandro Rivero
(74) *Attorney, Agent, or Firm* — Jeffrey Schox; Diana Lin

(57) ABSTRACT

A system and method for multi-beacon management including: determining occurrence of a trigger event; determining a beacon to be acted upon; determining the settings to be assigned; assigning the settings to the beacon; and operating the beacon according to the settings.

14 Claims, 14 Drawing Sheets

(56) References Cited

U.S. PATENT DOCUMENTS

| | | |
|---|---|---|
| 7,639,131 B2 | 12/2009 | Mock et al. |
| 7,705,728 B2 | 4/2010 | Mock et al. |
| 7,835,505 B2 | 11/2010 | Toyama et al. |
| 7,855,679 B1 | 12/2010 | Braiman |
| 7,983,677 B2 | 7/2011 | DaCosta |
| 8,058,988 B1 | 11/2011 | Medina, III et al. |
| 8,139,945 B1 | 3/2012 | Amir et al. |
| 8,260,320 B2 | 9/2012 | Herz |
| 8,265,621 B2 | 9/2012 | Kopikare et al. |
| 8,489,112 B2 | 7/2013 | Roeding et al. |
| 8,520,648 B2 | 8/2013 | Cordeiro |
| 8,559,975 B2 | 10/2013 | Lin et al. |
| 8,594,850 B1 | 11/2013 | Gourlay et al. |
| 8,612,604 B2 | 12/2013 | Beatty et al. |
| 8,644,255 B1 | 2/2014 | Burcham et al. |
| 8,694,060 B2 | 4/2014 | Vanderaa et al. |
| 8,694,782 B2 | 4/2014 | Lambert |
| 8,723,720 B2 | 5/2014 | Moffatt et al. |
| 8,781,502 B1 | 7/2014 | Middleton et al. |
| 8,791,901 B2 | 7/2014 | Mallinson |
| 8,797,214 B2 | 8/2014 | Taylor et al. |
| 8,847,754 B2 | 9/2014 | Buchheim et al. |
| 8,867,993 B1 | 10/2014 | Perkins et al. |
| 8,868,133 B1 | 10/2014 | Rosenbaum et al. |
| 8,886,230 B2 | 11/2014 | Sydir et al. |
| 8,934,389 B2 | 1/2015 | Kuehnel et al. |
| 8,938,196 B2 | 1/2015 | Bradish et al. |
| 8,971,850 B2 | 3/2015 | Klein et al. |
| 8,988,221 B2 | 3/2015 | Raji et al. |
| 8,996,030 B2 | 3/2015 | Grainger et al. |
| 9,014,715 B2 | 4/2015 | Alizadeh-Shabdiz et al. |
| 9,026,134 B2 | 5/2015 | Edge |
| 9,033,255 B2 | 5/2015 | Tessier et al. |
| 9,036,792 B2 | 5/2015 | Cacioppo et al. |
| 9,063,212 B2 | 6/2015 | Jones, Jr. |
| 9,113,309 B2 | 8/2015 | Uilecan et al. |
| 9,113,343 B2 | 8/2015 | Moshfeghi |
| 9,140,796 B2 | 9/2015 | Zhou |
| 9,154,565 B2 | 10/2015 | Monighetti |
| 9,202,245 B2 | 12/2015 | Kostka et al. |
| 9,258,674 B2 | 2/2016 | Chen |
| 9,282,582 B1 | 3/2016 | Dunsbergen et al. |
| 9,307,355 B2 | 4/2016 | Nehrenz et al. |
| 9,351,114 B2 | 5/2016 | Chatterjee et al. |
| 9,361,630 B1 | 6/2016 | Goswami |
| 9,408,060 B2 | 8/2016 | Helms et al. |
| 9,424,699 B2 | 8/2016 | Kusens et al. |
| 9,445,305 B2 | 9/2016 | Lyon et al. |
| 9,471,917 B2 | 10/2016 | Govindarajan et al. |
| 9,474,962 B2 | 10/2016 | Barney et al. |
| 9,544,744 B2 | 1/2017 | Postrel |
| 9,558,507 B2 | 1/2017 | Zilkha |
| 9,571,957 B2 | 2/2017 | Granbery |
| 9,591,570 B2 | 3/2017 | Kubo et al. |
| 9,622,046 B2 | 4/2017 | Otis et al. |
| 9,622,208 B2 | 4/2017 | Mycek et al. |
| 9,629,064 B2 | 4/2017 | Graves et al. |
| 9,642,173 B2 | 5/2017 | Granbery |
| 9,652,124 B2 | 5/2017 | Cotier et al. |
| 9,689,955 B2 | 6/2017 | Rosenbaum |
| 9,712,967 B2 | 7/2017 | Kostka et al. |
| 9,826,356 B2 | 11/2017 | Mycek et al. |
| 9,866,996 B1 | 1/2018 | Krzych et al. |
| 9,867,009 B2 * | 1/2018 | Mycek .................. H04W 4/023 |
| 2002/0176388 A1 * | 11/2002 | Rankin ................ G08G 1/0962 |
| | | 370/338 |
| 2003/0100315 A1 | 5/2003 | Rankin |
| 2006/0163349 A1 | 7/2006 | Neugebauer |
| 2006/0290519 A1 | 12/2006 | Boate et al. |
| 2008/0068519 A1 | 3/2008 | Adler et al. |
| 2008/0139306 A1 | 6/2008 | Lutnick et al. |
| 2009/0005079 A1 | 1/2009 | Shields et al. |
| 2009/0131079 A1 | 5/2009 | Sekhar |
| 2009/0311976 A1 * | 12/2009 | Vanderaa ................ G08C 17/04 |
| | | 455/90.3 |
| 2009/0327135 A1 | 12/2009 | Nguyen et al. |
| 2010/0317371 A1 | 12/2010 | Westerinen et al. |
| 2011/0029359 A1 | 2/2011 | Roeding et al. |
| 2011/0238188 A1 * | 9/2011 | Washiro ............. G05B 19/0426 |
| | | 700/19 |
| 2011/0246739 A1 * | 10/2011 | Matsuda ................ G06F 3/0605 |
| | | 711/165 |
| 2012/0095805 A1 | 4/2012 | Ghosh et al. |
| 2012/0190386 A1 | 7/2012 | Anderson |
| 2012/0309256 A1 | 12/2012 | Theodore |
| 2012/0316960 A1 | 12/2012 | Yang |
| 2013/0030915 A1 | 1/2013 | Statler et al. |
| 2013/0225197 A1 | 8/2013 | McGregor et al. |
| 2014/0087758 A1 | 3/2014 | Maor |
| 2014/0122855 A1 * | 5/2014 | Maneval ............ G05B 19/0426 |
| | | 713/1 |
| 2014/0148196 A1 | 5/2014 | Bassan-Eskenazi et al. |
| 2014/0220883 A1 | 8/2014 | Emigh et al. |
| 2014/0277654 A1 | 9/2014 | Reinhardt et al. |
| 2015/0081474 A1 | 3/2015 | Kostka et al. |
| 2015/0106196 A1 | 4/2015 | Williams et al. |
| 2015/0163828 A1 | 6/2015 | Vandwalle et al. |
| 2015/0245305 A1 | 8/2015 | Camps Mur |
| 2015/0276432 A1 * | 10/2015 | Repyevsky .......... G05B 19/048 |
| | | 340/870.03 |
| 2015/0279115 A1 | 10/2015 | Vukicevic |
| 2015/0296048 A1 | 10/2015 | Gerding et al. |
| 2015/0304843 A1 * | 10/2015 | Hillyard ................ H04W 12/06 |
| | | 726/5 |
| 2015/0334548 A1 | 11/2015 | Liu et al. |
| 2015/0351008 A1 | 12/2015 | Mayor |
| 2016/0014609 A1 | 1/2016 | Goel et al. |
| 2016/0063550 A1 | 3/2016 | Caldwell |
| 2016/0086460 A1 | 3/2016 | King et al. |
| 2016/0094598 A1 | 3/2016 | Gedikian |
| 2016/0099758 A1 | 4/2016 | Bell et al. |
| 2016/0188919 A1 | 6/2016 | Gao et al. |
| 2016/0192407 A1 | 6/2016 | Fyfe et al. |
| 2016/0291127 A1 | 10/2016 | Huang et al. |
| 2017/0019765 A1 | 1/2017 | Hoyer et al. |
| 2017/0079001 A1 | 3/2017 | Lewis |

FOREIGN PATENT DOCUMENTS

| | | |
|---|---|---|
| WO | 043388 | 3/2016 |
| WO | 040690 | 3/2017 |

\* cited by examiner

SYSTEM AND METHOD FOR MULTI-BEACON INTERACTION AND MANAGEMENT

CROSS-REFERENCE TO RELATED APPLICATIONS

This application is a continuation of U.S. patent application Ser. No. 15/466,680, filed 22 Mar. 2017, which claims the benefit of U.S. Provisional Application Ser. No. 62/311,537, filed 22 Mar. 2016, both of which are incorporated in their entirety by this reference.

This application is related to U.S. patent application Ser. No. 15/288,302, filed 7 Oct. 2016, U.S. patent application Ser. No. 15/253,376, filed 31 Aug. 2016, and U.S. patent application Ser. No. 15/436,564, filed 17 Feb. 2017, each of which are incorporated in their entirety by this reference.

TECHNICAL FIELD

This invention relates generally to the wireless communication field, and more specifically to a new and useful system and method for facilitating multi-beacon interaction in the wireless communication field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
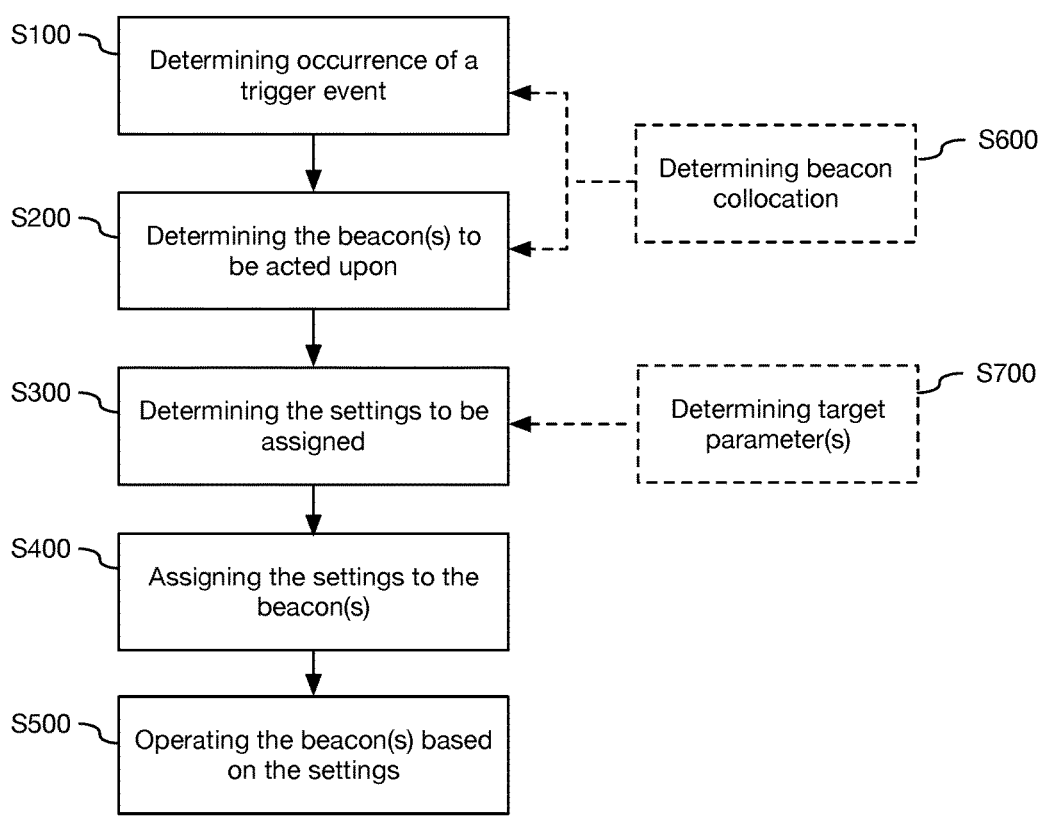
FIG. 1 is a flowchart representation of the method for multi-beacon interaction.

As shown in FIG. 1, the method for multi-beacon management includes: determining occurrence of a trigger event S100; determining the beacon to be acted upon S200; determining the settings to be assigned S300; assigning the settings to the beacon S400; and operating the beacon according to the settings S500. This method functions to extend the functional lifetime of a set of beacons.

In a first variation, the method extends the functional lifetime of a beacon set by automatically migrating beacon settings from old beacons to new beacons. In an embodiment of the first variation, the system includes an old, pre-configured beacon (e.g., venue, object), and a new, unconfigured beacon (e.g., with default settings). In this variation, broadcast parameters from the pre-configured beacon can be migrated to the unconfigured beacon. In a second variation, the method extends the functional lifetime of a beacon set by automatically decreasing the power expenditure of each beacon within a set, while maintaining the same overall identifier broadcast rate from the beacon set as a whole. In an embodiment of the second variation, beacon advertisement parameters (e.g., frequency, timing) can be coordinated amongst a beacon plurality to cooperatively simulate a single beacon. However, the system can include any suitable number of beacons interacting in any other suitable manner. However, the method can extend the functional lifetime of a beacon set in any other suitable manner.

2. Benefits

Individual beacons typically have a limited functional lifetime (e.g., 3-4 years). This beacon lifetime is typically defined by the amount of power that can be stored on-board the beacon (as most beacons are disconnected from a continuous source of power), the transmission power required by the wireless communication protocol for each broadcast, and the information broadcast rate. This limited lifespan can be problematic in applications requiring beacon operation for longer durations. In particular, the limited lifespan requires beacon operators to not only continuously monitor their beacons for low beacon state of charge (SOC), but also requires the beacon operators to re-program each replacement beacon with the settings for the replaced beacon. This re-programming can be time-consuming and difficult, as the settings for the to-be-replaced beacon (e.g., now-dead beacon, or close-to-dead beacon) can be difficult to identify and/or retrieve.

This system and method can resolve this latter issue (beacon re-programming) by enabling easy beacon replacement. In particular, in some variations, the system and method automatically identifies the new and old beacons, and seamlessly migrates settings from old beacons to new beacons without much, or any, user input.

The system and method can additionally resolve the former issue (limited beacon lifespan) by leveraging multi-beacon coordination. In particular, in some variations, the system and method automatically coordinates operation between multiple beacons to minimize the power consumption rate of each beacon. In one example, the system and method divides the advertising interval between each beacon in a set, such that each beacon broadcasts less frequently. In a second example, the system and method coordinates the beacons to advertise concurrently with less broadcasting power, relying on constructive signal interference to provide the desired signal strength at a given physical location. However, the system and method can resolve these issues in any other suitable manner.

3. System

Figure 6:
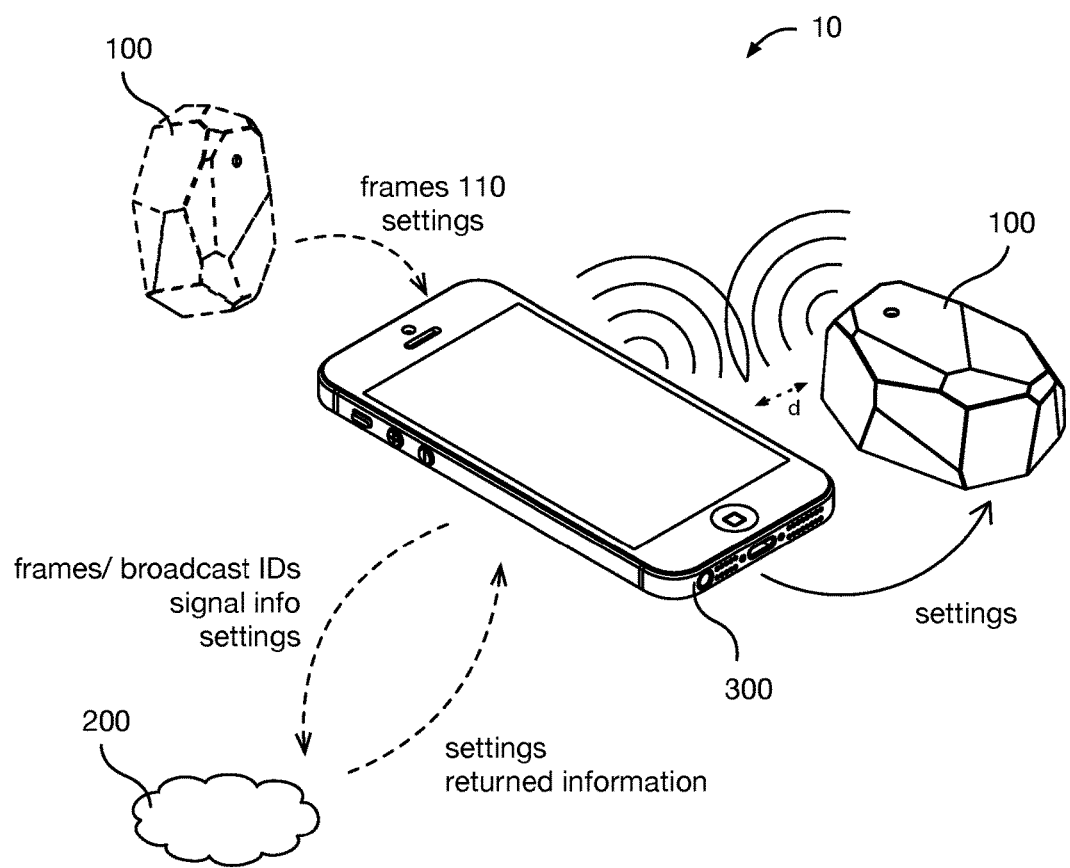
FIG. 6 is a schematic representation of a variation of the system for multi-beacon interaction.

As shown in FIG. 6, the system 10 for multi-beacon interaction can include: one or more beacons and a management system. The system can additionally include a user device or any other suitable device.

3.1 Beacon.

The beacon 100 of the system functions to broadcast a frame 110 according to a set of beacon settings. The beacon can optionally function as a receiving device (e.g., receive frames; determine the received signal strength, which can be used to determine the transmitting beacon's SOC, trilaterate or triangulate the transmitting beacon's location; etc.) or perform any other suitable functionality. The beacon can optionally receive or transmit data packets, which can include beacon frames, control instructions, information identifiers (e.g., a URI), or any other suitable data. When the beacon receives data packets, the beacon can unpack the data packet, forward the data packet, or otherwise manage the data packet.

The system can include one or more beacons of one or more types. Examples of beacon types include: a venue beacon (e.g., statically mounted to a venue surface), an object beacon (e.g., statically mounted to an object, such as a mobile object), a powered beacon (e.g., plugged into a power source), or any other suitable beacon. In one variation, the beacons can be organized into clusters of one or more beacons. The beacons in the cluster can be separate and distinct, touching, or otherwise physically related.

The frame 110 (e.g., packet) functions to encode information in the signal broadcast (e.g., advertised) by the beacon. The frame can be received by the user device, secondary beacon system(s), other beacons, or by any other suitable device proximal the beacon. The frame is preferably broadcast by the beacon (or set of beacons) according to the beacon settings, but can be otherwise broadcast. The frame can encode information according to iBeacon, Eddystone, WiFi, Zigbee, Z-wave, or any other suitable protocol. The frame information (e.g., payload) can include a beacon identifier, a URI, beacon operation parameter values, reference values (e.g., reference RSSI), and/or any other suitable information. The frame information can be determined based on the beacon settings, be received from a user, be generated by the beacon itself (e.g., based on sensors or systems on-board the beacon), or otherwise determined.

The beacon identifier can be used to retrieve information (e.g., settings) associated with the beacon. The information can be retrieved from the beacon itself or an external system, such as a remote computing system, a second beacon, a user device, or another system. In one example, the information can be product information for a product associated with the beacon. In a second example, the retrieved information can be for a geographic region associated with (e.g., encompassing or proximal) the beacon. In a third example, the retrieved information can be a link (e.g., a URI) from which information can be retrieved. However, the information associated with the beacon can be any other suitable information.

The beacon identifier and/or pattern of identifiers (over time, space, etc.) can be a globally unique identifier, a locally unique identifier (e.g., unique among beacons within a geographic region), a temporally unique identifier (e.g., unique among beacons concurrently active), a non-unique identifier, or any other suitable identifier. The beacon identifier can be static (e.g., permanently assigned to the beacon), variable or dynamic (e.g., periodically assigned to the beacon), or otherwise configured. The variable beacon identifier can be automatically generated based on a static identifier associated with the beacon (e.g., calculated), randomly assigned, or otherwise determined. The variable beacon identifier can be generated by a remote computing system, the beacon, a secondary beacon system, a user device, or any other suitable computing system. The variable beacon identifier (e.g., broadcast identifier) can be resolved into the beacon's static identifier (e.g., manufacturer identifier, beacon identifier) by a receiving device or system connected to the receiving device (e.g., using the equation, etc.). The variable beacon identifier can be resolved in the manner disclosed in U.S. application Ser. No. 14/463,582 filed 19 Aug. 2014, which is incorporated in its entirety by this reference, or be otherwise resolved. In one example, the beacon identifier is a globally non-unique identifier that is resolved into a globally unique identifier by an external system (e.g., using a set of rules, an encoded key, an equation, the location of the user device receiving the beacon identifier, the pattern of broadcast identifiers, etc.). However, the beacon identifier can be otherwise determined and/or used.

The beacon operation parameter values (e.g., telemetry data) function to characterize historic and/or current beacon operation. Receiving devices (e.g., user devices, other beacons, the remote computing system) can use the operation parameter values to track beacon performance or health, detect trigger events, monitor venue or object interaction, or use the operation parameter values in any other suitable manner. Beacon operation parameters can include: beacon SOC (state of charge); battery voltage; temperature; pressure; ambient light; ambient acoustics; time (e.g., relative or absolute; acceleration (e.g., 3-axis, single axis); whether the beacon is or was in motion; motion state duration; beacon location (e.g., relative, GPS, etc.); beacon uptime (e.g., since last restart); magnetometer readings; GPIO pin state; information about external device connections to the beacon, such as number of connections, connection frequency, connection time, or other connection information (e.g., determined by a secondary radio operating in master mode or otherwise scanning for connections); error codes (e.g., firmware, internal clock errors, etc.); or include any other suitable parameter value. Beacon operation parameters can be determined (e.g., calculated, measured, etc.) based on signals sampled by on-board sensors, other computing systems (e.g., beacons, user devices, etc.), or otherwise determined. Beacon operation parameters can be included in the broadcast frame, retrieved from the beacon, estimated or calculated (e.g., based on the beacon's runtime or number of user device queries for the beacon identifier), or otherwise determined.

The beacon settings function to define how the beacon operates, what information the beacon is associated with (e.g., the frame information, retrieved information), and/or any other suitable beacon-associated information. The beacons can be pre-configured with beacon settings, unconfigured (e.g., operate according to default beacon settings), or otherwise configured. All or a portion of the beacon settings can be stored on the beacon, the remote computing system, the user device, or otherwise stored.

The beacon settings can include: broadcast parameters, frame information (e.g., payload information), returned information, permissions information, or any other suitable information. Beacon settings can be automatically determined (e.g., using the method described herein, based on an associated user account or cluster, etc.), manually specified, or otherwise determined.

Broadcast parameters (e.g., advertising parameters) function to define how the beacon should broadcast the frames, and can additionally or alternatively determine all or a portion of the beacon frame information. Broadcast parameters can include: the beacon identifier (e.g., the broadcast identifier, information underlying the broadcast identifier, UUID, major, minor, etc.), advertising frequency (e.g., frequency of advertising events separated by an advertising interval), advertising interval (e.g., broadcasting interval, broadcasting period), advertising time (e.g., broadcasting time) (e.g., relative time to a reference point, such as a power-on time; global or absolute time, such as from a GPS signal or an external device; etc.; time of each advertising event, time for the first advertising event; etc.), advertising trigger event, broadcasting power, broadcast schedule (e.g., including the identifier to be broadcast at a given advertising frequency, advertising time, broadcast power, etc.), reference RSSI (e.g., expected RSSI a predetermined distance from the beacon), operation modes, and/or any other suitable information.

In one variation, the beacon, or set thereof, is operable between one or more operation modes. Operation modes can include: a high power mode (e.g., on, broadcasting, etc.), a low power mode (e.g., off; sleeping; etc.), a default broadcasting mode (e.g., broadcasting according to default settings), as configured broadcasting mode (e.g., broadcasting according to configured settings), a serial broadcasting mode (e.g., each beacon in the set sequentially broadcasts shared information), a concurrent broadcasting mode (e.g., each beacon in the set concurrently broadcasts shared information), a master mode (e.g., the beacon functions as a master device), a slave mode (e.g., the beacon functions as a slave device), or include any other suitable set of operation modes. The beacons preferably operate as slave devices, but can additionally or alternatively constantly or periodically function as master devices. The beacons preferably operate in the default mode until configured, but can operate in any other suitable mode. The beacons preferably operate in the default mode when reset (e.g., upon occurrence of a reset event, such as beacon receipt of a reset instruction, beacon detection of a reset motion pattern, triggering a reset button or switch on the beacon, etc), but can alternatively operate in any other suitable mode when reset.

Returned information preferably includes the information returned by the remote computing system and/or user device based on the beacon identifier, but can include other information. Returned information can include: content (e.g., images, video, templates, etc.), user information (e.g., purchase history, travel history, etc.), an action (e.g., open a browser, launch a client or native application, send a notification, etc.), URI(s), beacon settings (e.g., for the beacon itself or other beacons), or any other suitable information. Other information the beacon can be associated with include: a beacon name, beacon tag (e.g., metadata), GPS location, schedule (e.g., operation mode schedule), MAC address, hardware or software revision, or any other suitable information.

The beacon can include one or more: communication systems, sensors, processing systems, power sources, mounting mechanisms, or any other suitable component.

The communication system of the beacon functions to transmit and/or receive data packets. The communication system is preferably selectively operable between broadcasting and listening (e.g., periodically switch states, etc.), wherein the processing system preferably operates the radio between the two modes, but can alternatively be otherwise operated. The communication system can be wired (e.g., Ethernet), wireless (e.g., include a radio), or be otherwise configured.

The radio can include a transceiver and an antenna, but can alternatively include any other suitable component. The transceiver can be integrated in to the processing system or be separate. The antenna is preferably an omnidirectional antenna, but can alternatively be a directional antenna, an antenna array (e.g., wherein the beacon can individually or cooperatively perform beamforming techniques to target signals in a predetermined direction), or be any other suitable type of antenna. The beacon can include one or more radios. The radio is preferably for a short-range communication technology, but can additionally or alternatively be for a long-range communication technology. Examples of the radio include: a Bluetooth radio, a BLE radio, a Bluetooth long distance radio, a WiFi radio, a WLAN radio, a WiMAX radio, a Zigbee radio, a NFC radio, or any other suitable short or long range repeater, extender, protocol translator, or other suitable means for conducting a one-way or two-way communication protocol. In a specific example, the radio includes a 2.4 GHz BLE radio.

The sensor functions to monitor operation parameters of the beacon system. The operation parameters can include beacon system parameters (e.g., power storage SOC, user connection frequency, internal temperature, physical orientation, etc.), environmental parameters (e.g., ambient temperature, ambient light, ambient noise, vibration, etc.), or include any other suitable parameter. The beacon system can include one or more sensors of the same or different type. The sensor can be an accelerometer, gyroscope, altimeter, microphone, transducer, temperature sensor, light sensor, or be any other suitable sensor.

The processing system of the beacon system functions to control frame broadcasting, control data transfer between the beacon and external systems (e.g., user device, remote computing system, secondary beacons), manage beacon system operation between the set of operation modes, or perform any other suitable functionality. The beacon system can include one or more processing systems of the same or different type. The processing system can be a CPU, GPU, microprocessor, or be any other suitable processing system. The processing system can additionally include memory (e.g., RAM, flash), or include any other suitable component.

The processing system is preferably electrically coupled to (e.g., connected to) and communicates with the radio, sensor (s), or any other suitable component.

The power source of the beacon system functions to power the beacon system components. The beacon can be operable in a single power class, multiple power classes, or any other suitable power class. The power source is preferably wired to the powered components, but can alternatively be wirelessly connected to the powered components (e.g., via induction). The beacon system can include one or more power sources of the same or different type. The power source can include a battery (e.g., secondary battery, such as lithium chemistry batteries, nickel cadmium batteries, CR2477 batteries, etc.), a power connector (e.g., a wall outlet plug, a set of pins, an induction coil, or any other suitable power connector, etc.), an energy harvesting system (e.g., motion harvesting), or any other suitable power source.

The beacon can additionally include a housing that functions to mechanically encapsulate the beacon components. The housing can be made of plastic, metal, ceramic, or from any other suitable material. The housing preferably entirely encapsulates the beacon components, but can alternatively partially expose the components or otherwise encapsulate the components. The housing can optionally include a mounting mechanism that functions to mount the beacon to a mounting surface. Examples of the mounting mechanism include: adhesive, hooks, clips, screws, or any other suitable transient or permanent mounting mechanism. In one variation, the mounting mechanism can double as a power switch for the beacon (e.g., wherein mounting the beacon connects a power circuit; tearing off the adhesive connects or disconnects a power circuit; etc.). However, the beacon can include any other suitable component.

3.2 Management System

The management system 200 functions to store and/or associate beacon information, beacon identifiers (e.g., static identifiers, variable identifiers, identifier resolution rules, global identifiers, etc), beacon settings (e.g., associated with the beacon identifier and/or associated user device), or any other suitable information. The management system can additionally or alternatively: resolve broadcast beacon identifiers into static beacon identifiers, verify access to beacon information, verify access for beacon setting adjustment (e.g., using a whitelist, blacklist, password, credentials, etc.), monitor beacon performance (e.g., based on the beacon telemetry data received from intermediary devices, such as user devices or another WAP, etc.; wherein the management system automatically sends a notification to replace a beacon or clone the beacon settings when the beacon SOC falls below a threshold, etc.), monitor user device location(s) (e.g., based on the known physical locations of the beacon(s) transmitting the signals received by the respective user device and the signal receipt time); migrate beacon settings from a first beacon identifier to a second beacon identifier, determine and/or coordinate multi-beacon broadcast, or perform any other suitable functionality. In one variation, the management system functions as the source of truth, and controls all setting reassignment or updates (e.g., the settings stored on the beacon are always received from the management system). In a second variation, the management system functions as a backup, and stores a copy of the settings for each beacon (e.g., beacon setting adjustment can bypass the management system). However, the management system can perform any other suitable functionality. The management system preferably includes a set of remote computing systems (e.g., a DNS system) including one or more servers, but can alternatively or additionally include a set of beacons (e.g., a master beacon), user devices (e.g., a native application executing on the user device, a browser application on the user device, etc.), or be any other suitable computing system.

3.3 User Device.

The system can additionally include a user device 300. The user device can function as an intermediary between the beacon(s) and the management device. The user device can additionally or alternatively receive beacon signals (broadcast by the beacons), send the beacon frames (e.g., extracted from the beacon signals) to the management system, analyze beacon signal parameters (e.g., signal strength) and/or beacon telemetry values (e.g., extracted from the frame), receive returned information from the management system, send the returned information to one or more endpoints (e.g., beacons), display the beacon information, or perform any other suitable function. The user device can additionally or alternatively execute a native application (e.g., client), a browser application, or any other suitable application that functions to perform all or part of the method (e.g., receive beacon signals, process beacon signals and/or frames, associate frames with access permissions prior to transmission to the remote computing system, etc.). The user device preferably functions as a master device, but can alternatively or additionally function as a slave device (e.g., periodically, continuously, etc.).

The user device is preferably a mobile device associated with the user (e.g., through a user account), and can include mobile phones, laptops, smartphones, tablets, watches, or any other suitable mobile device. However, the user device can be stationary. The user device can include: one or more data connections (e.g., radios), outputs (e.g., display, speakers, etc.), inputs (e.g., touchscreen, keyboard, microphone, camera, light sensor, etc.), power storage, and/or any other suitable component. The one or more data connections function to communicate data with the remote computing system and/or one or more beacons. The data connection is preferably of the same type (e.g., protocol) as the beacon communication system, but can additionally or alternatively be different (e.g., wherein the system includes an intermediary translator). The data connection is preferably a wireless connection, such as WiFi, a cellular network service, or any other suitable wireless connection, a near field connection, such as radiofrequency, Bluetooth, or any other suitable near field communication connection, or a wired connection, such as a LAN line. The user device can additionally or alternatively function as the server, such as in a distributed network system.

3.4 Setting Repository.

The system can optionally include a setting repository, which functions to store the settings for and/or to be assigned to each beacon or beacon cluster. The setting repository can be the beacon to be cloned, the system determining the settings (e.g., calculating the settings, retrieving the settings, etc.), or be any other suitable system. The setting repository can be a beacon (e.g., beacon to be cloned, beacon that received the cluster's settings, etc.), the user device, the management system, or any other suitable system.

4. Method

As shown in FIG. 1, the method for multi-beacon interaction (e.g., method for extending the effective lifespan of a beacon) includes: determining the occurrence of a trigger event S100; determining the beacons to be acted upon S200;

determining the settings to be assigned S300; assigning the settings to the beacons S400; and operating the beacons according to the settings S500. The method is preferably performed with the system described above, but can alternatively be performed with any other suitable system.

Figure 2:
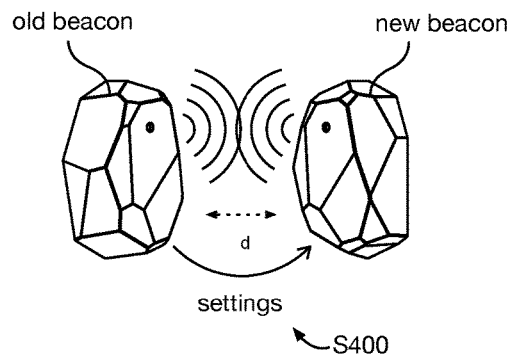
FIG. 2 is a schematic representation of a first variation of setting migration from a first beacon to a second beacon.
Figure 3:
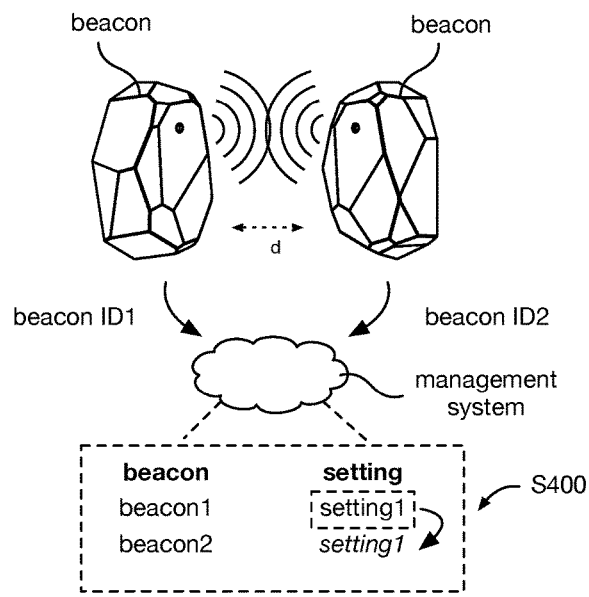
FIG. 3 is a schematic representation of a second variation of setting migration from a first beacon to a second beacon.

In a first variation, the method extends the functional lifetime of a beacon set by automatically migrating beacon settings from old beacons (e.g., configured beacons) to new beacons (e.g., unconfigured beacons) (examples shown in FIGS. 2 and 3). In an embodiment of this variation, this method can include: detecting a migration initiation event, determining beacon settings for the old beacon, storing the beacon settings on the new beacon, and operating the new beacon according to the beacon settings. In an example of this embodiment, the method can include: placing a new beacon next to an old beacon, detecting a migration initiation event, listening for packets broadcast by the old beacon, generating migration data including the broadcast identifier for the old beacon (e.g., at the user device or management system), transmitting the migration data (e.g., to the new beacon and/or management system), and automatically assigning the settings for the old beacon to the new beacon in response to receipt of the migration data (e.g., at the new beacon and/or management system), such that the new beacon functions as the old beacon. The new beacon can additionally be reset to default settings, such that the new beacon can be reused. In a second example, the user device listens for the packet, receives the dynamic or static identifier for the new beacon (e.g., broadcast by the new beacon), generates the migration data based on the received packet and new beacon identifier (e.g., connects to and retrieves the broadcast parameters from the old beacon), and sends the migration data to the new beacon and/or remote computing system. The new beacon is preferably placed within a predetermined distance of the old beacon (e.g., within 1 inch, 2 inches, 5 inches, 10 inches, etc.), but can alternatively be placed on top of the old beacon or otherwise positioned. The migration initiation event can include: shaking the new beacon, coupling the new beacon to the mounting surface, selection of a migration icon on a native application on the user device, or any other suitable migration initiation event. The new beacon, the user device, or any other suitable device can listen for packets broadcast by the old beacon and/or generate the migration data. In one embodiment, the new beacon listens for the packet (e.g., broadcast identifier, broadcast information, etc.), generates the migration data based on the received packet (e.g., packages the broadcast identifier for the old beacon with a dynamic or static identifier for the new beacon), and sends the migration data to the user device (e.g., application) for transmission to the remote computing system. After setting migration, the new beacon can function as a clone of the old beacon, return the same information as the old beacon, or otherwise function as the old beacon.

Figure 4:
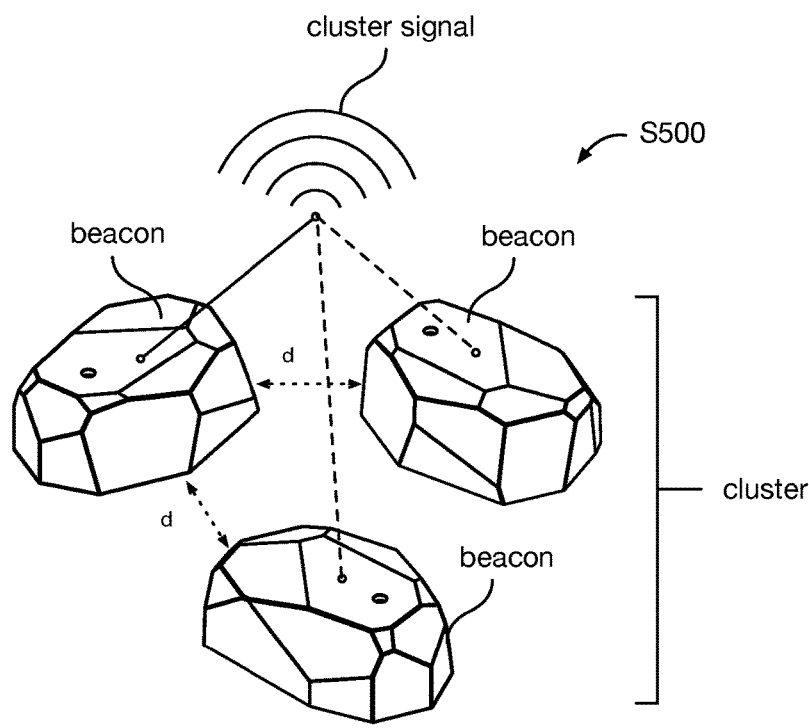
FIG. 4 is a schematic representation of a first variation of beacon cluster operation.
Figure 5:
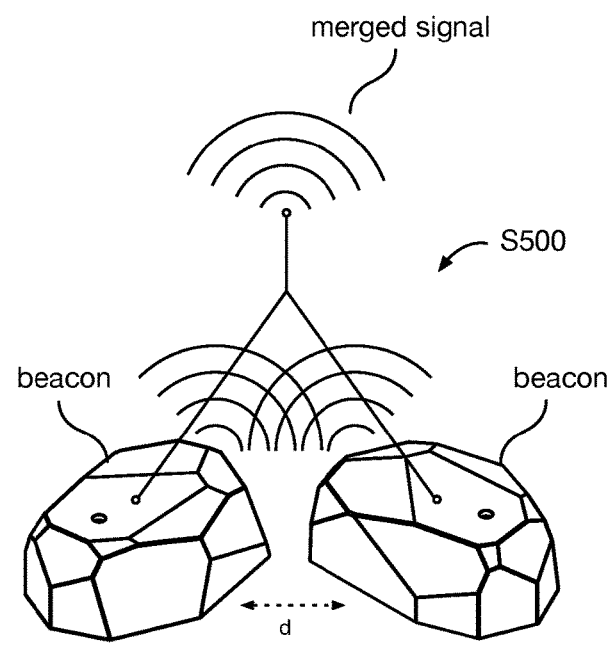
FIG. 5 is a schematic representation of a second variation of beacon cluster operation.

In a second variation, the method extends the functional lifetime of a beacon set by automatically coordinating the broadcast parameters of each beacon within a beacon cluster to decrease power consumption (examples shown in FIGS. 4 and 5). In this variation, the method can include: placing a plurality of beacons close together, detecting a clustering event, identifying beacons within the cluster, and automatically assigning broadcast parameters (e.g., including a common broadcast identifier and the same or differing broadcast schedule) to all beacons within the cluster, such that all beacons within the cluster cooperatively simulate a single beacon. In one embodiment, the variant includes decreasing the broadcast rate for each beacon (e.g., by the number of beacons within the cluster. In a second embodiment, the method includes decreasing the broadcasting power output for each beacon (e.g., halving the broadcasting power) by relying on constructive interference to provide sufficient broadcast strength. In this embodiment, the method can additionally include determining the position of each beacon within the cluster relative to other beacons within the cluster (e.g., automatically or manually, by one or more beacons or the user device, etc.), and coordinating beacon broadcasting times to maximize the interference volume, maximize the number of interference regions, optimize interference within a predetermined physical volume, or achieve any other suitable goal. Alternatively or additionally, the broadcast times amongst all beacons can be synchronized within the cluster, such that all beacons within the cluster broadcast at the same time. Each beacon is preferably placed within a predetermined distance of another beacon within the cluster (e.g., within 1 inch, 2 inches, 5.08 cm, 5 inches, 10 inches, etc.), but can alternatively be placed on top of other beacons within the cluster or otherwise positioned. The clustering event can include: shaking the new beacon, coupling the beacon to the mounting surface, selection of a clustering icon on a native application on the user device, detecting multiple beacons within a predetermined physical volume, detecting multiple beacons without settings within a predetermined physical volume, or include any other suitable clustering initiation event. The new beacon, the user device, or any other suitable device can identify the beacons within the cluster. The beacons within the cluster can be beacons unassociated with any settings or with default settings (e.g., as determined by the management system), beacons selected by the user (e.g., on a user device, such as through the application), beacons broadcasting a default identifier, beacons arranged within a predetermined distance of the user device or within a predetermined physical space, or be otherwise identified. The settings are preferably automatically assigned to the beacons (e.g., after identification) by the remote computing system, but can alternatively be assigned after receipt of the settings from a user, or otherwise assigned. The settings can include the broadcast identifier, broadcast schedule, associated information, or any other suitable information. In a first specific example, a first beacon of the cluster can be set up by the user, wherein the remaining beacons of the cluster are cloned in the manner disclosed in the first variation of the method. In a second specific example, all beacons of the cluster are set up at the same time. However, beacon setting assignment can be otherwise performed. However, the method can extend the functional lifetime of a beacon set in any other suitable manner.

4.1 Detecting a Trigger Event.

Determining occurrence of a trigger event S100 functions to determine when beacon settings should be cloned, migrated, or otherwise changed. Additionally or alternatively, the trigger event can function to determine when beacons should be clustered, or trigger any other suitable process. The trigger event can function as a migration initiation event, a clustering event, or any other suitable event. The trigger event can be detected by the new beacon (e.g., unconfigured beacon, beacon with default settings, a beacon without associated settings), an old beacon (e.g., configured beacon, a beacon with associated settings), a user device, a remote computing system (e.g., in response to receipt of a beacon identifier without associated settings), or by any other suitable system.

Figure 7:
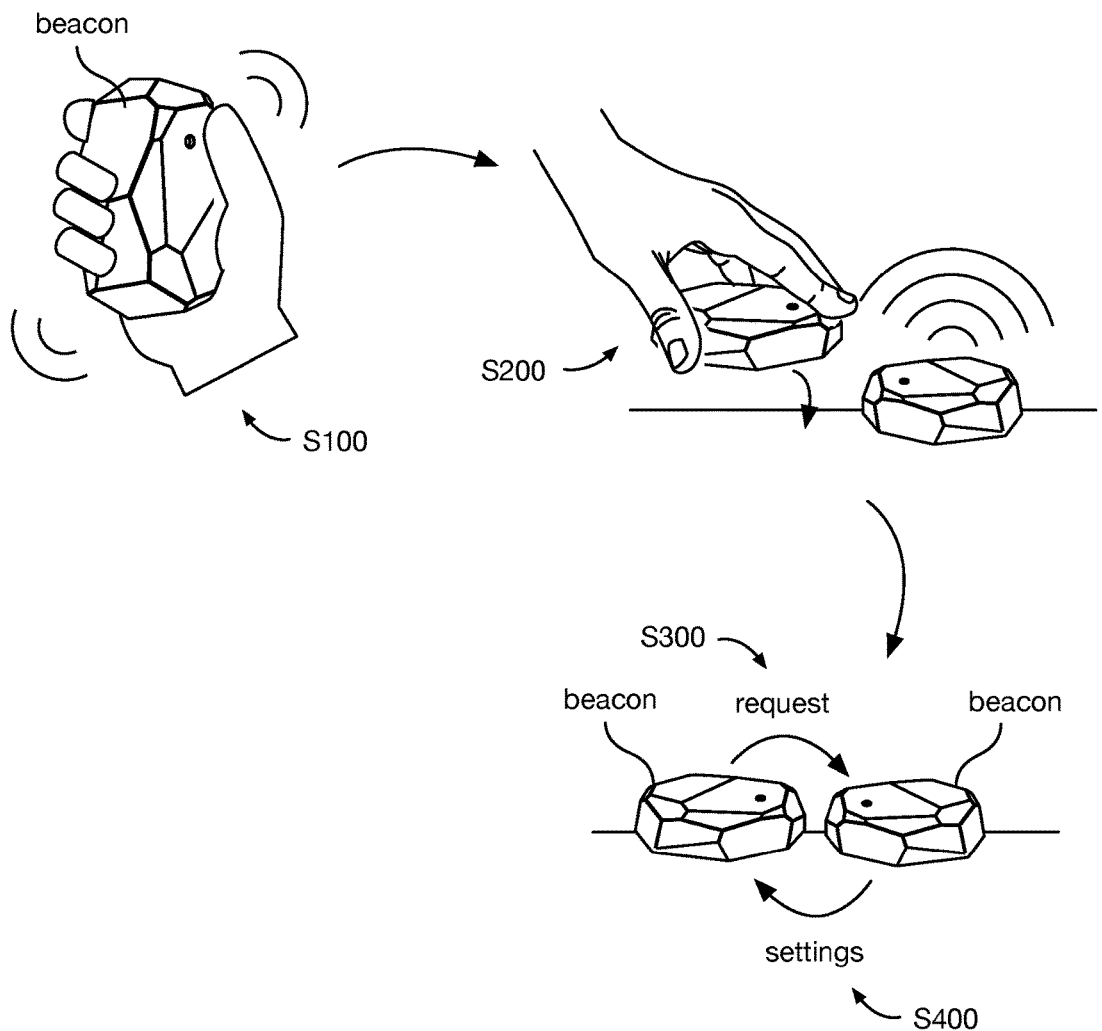
FIG. 7 is a schematic representation of a first variation of the method, including detecting a trigger event and transferring settings in response to the trigger event from a first beacon to a second beacon.
Figure 8:
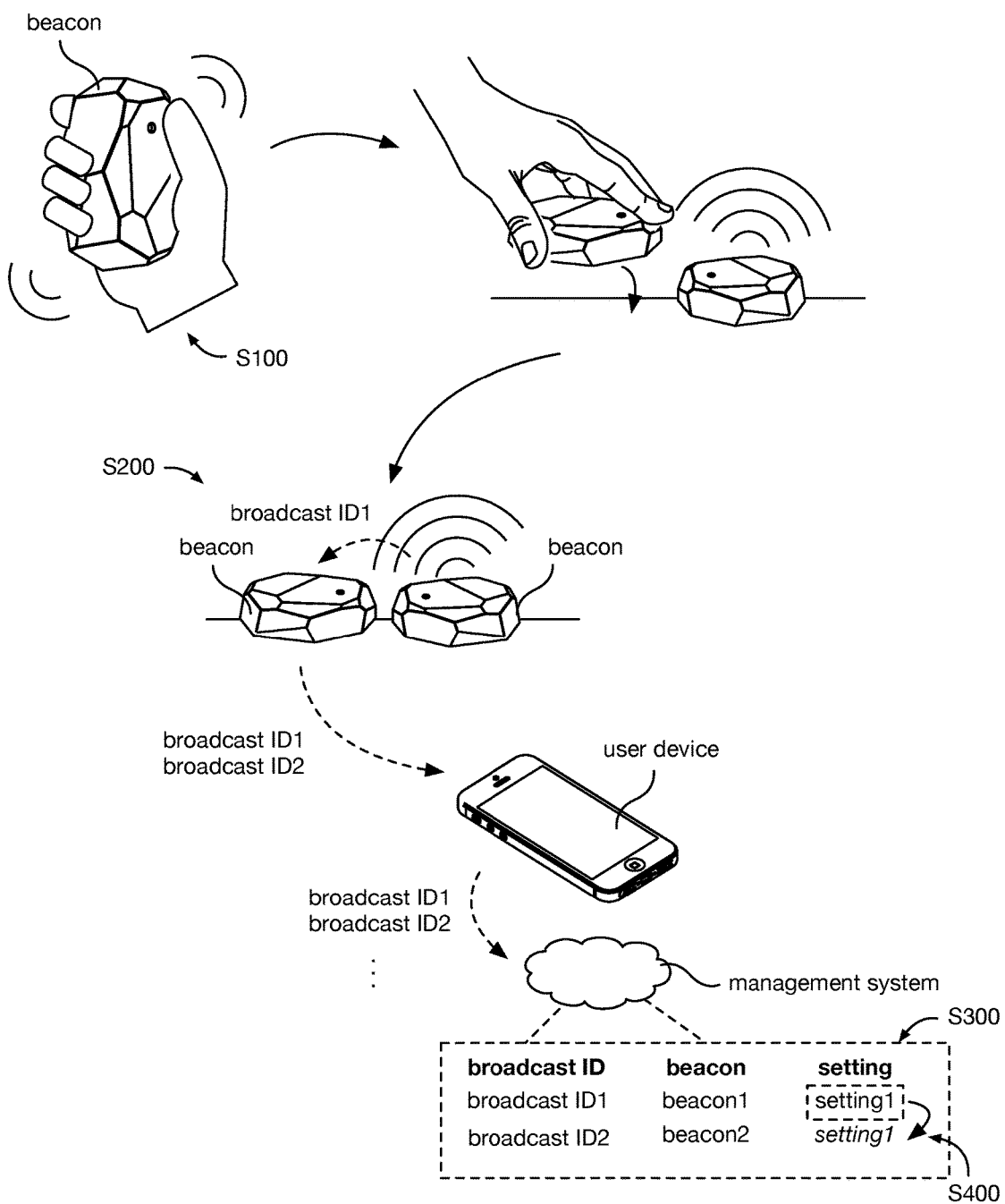
FIG. 8 is a schematic representation of a second variation of the method, including detecting a trigger event, listening for a beacon identifier, and assigning settings based on the received identifier.
Figure 9:
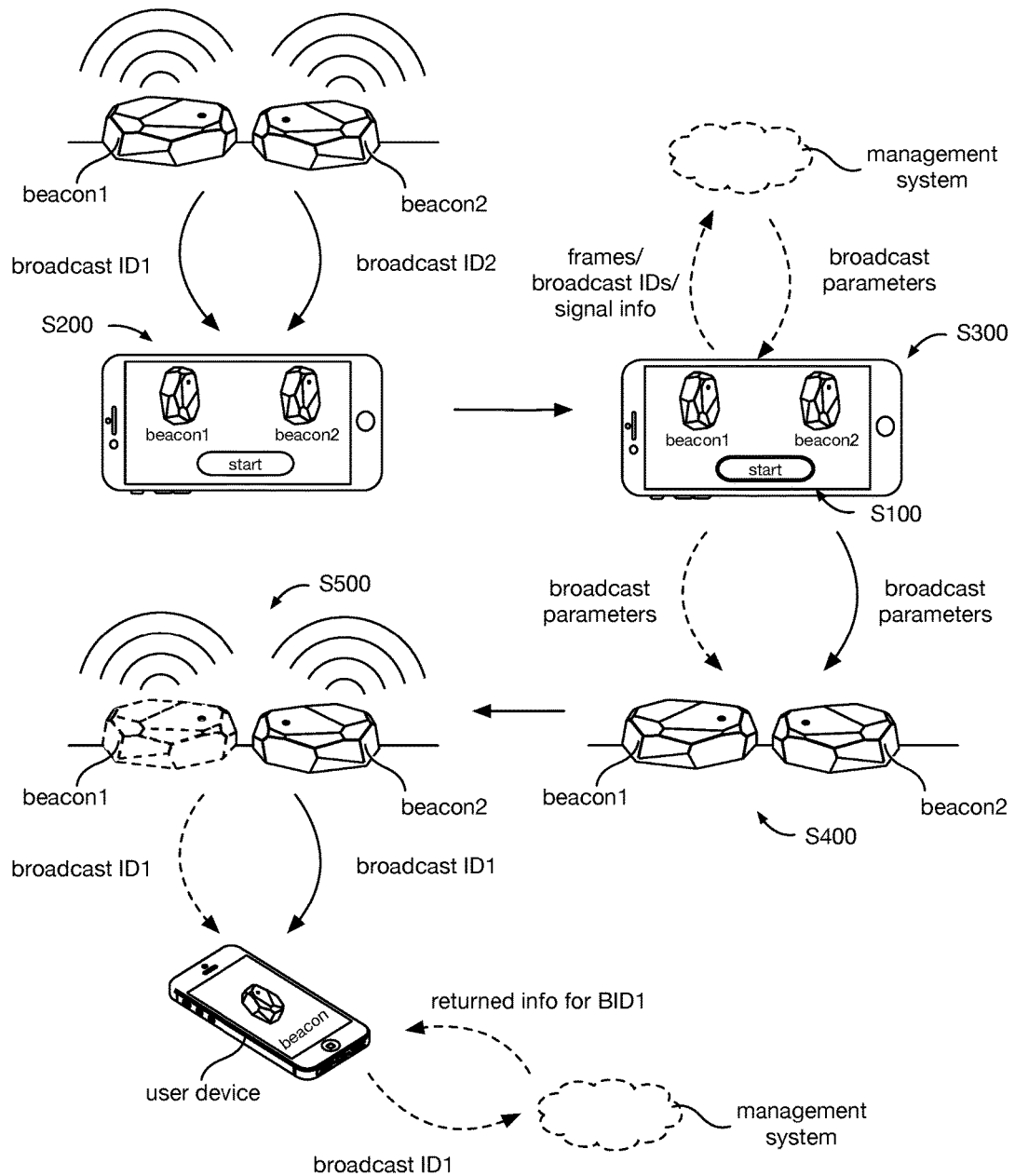
FIG. 9 is a schematic representation of a third variation of the method, including determining the beacon(s) within the cluster, detecting a trigger event, determining the settings for the beacon(s), assigning the settings to the beacons (e.g., storing the settings on-board the beacon(s)), and operating the beacons based on the settings.

In a first variation, the trigger event can be beacon vibration (e.g., as detected by the beacon accelerometer, example shown in FIG. 7), beacon mounting to a surface (example shown in FIG. 10, e.g., wherein the mounting mechanism includes a switch actuated by beacon mounting, wherein switch actuation can be the trigger event), or beacon power-on. In a second variation, the trigger event can be beacon receipt of a broadcast signal, frame, or identifier (e.g., wherein the beacon operates as a master device; through the broadcasting protocol, through a second short-range broadcasting protocol, such as NFC, BLE, etc.). In a third variation, the trigger event can be beacon placement within a predetermined geofence or volume (e.g., predefined by a user). In a fourth variation, the trigger event can be user device vibration (e.g., detected by the user device accelerometer). In a fifth variation, the trigger event can include user device or management system receipt of a signal broadcast by a new beacon (e.g., a beacon without assigned settings), wherein the frame can include default settings (e.g., default identifier), have a different structure from beacons with settings, or be otherwise identified. In one example, the user device can automatically launch the setting transfer application in response to receipt of the new beacon identifier. In a sixth variation, the trigger event can include selection of a setting transfer icon (e.g., migration initiation icon, clustering icon, etc.) at an application on the user device (examples shown in FIGS. 9 and 10. In a seventh variation, the trigger event can be satisfaction of a set of conditions (e.g., timer expiration, ambient parameters meeting predetermined values, etc.). However, any other suitable trigger event can be detected.

4.2 Beacon Set Determination.

Determining the beacons to be acted upon S200 functions to identify the beacons for setting assignment. The beacon set (e.g., cluster) can be determined automatically, manually, or otherwise determined. The beacon set can be determined by a user (e.g., wherein the user selects the IDs or representations for beacons to be included in the cluster, example shown in FIG. 10), a user device (e.g., wherein the cluster includes all or some of the beacons from which the user device receives signals within a given time period, user device translation range, or other bounding condition; example shown in FIG. 9), the beacon(s) itself (e.g., wherein the beacon receives signals from adjacent beacons, such as while operating in a master mode), the management system (e.g., beacons sharing a common user identifier, location, tag, or other variable value), manufacturer determined (e.g., pre-associated into clusters at the manufacturing or shipping facility), or otherwise determined. The beacon set is preferably determined after trigger event occurrence, but can be determined before trigger event occurrence or at any other suitable time.

In a first variation, the beacons to be acted upon are collocated beacons, wherein the method includes determining beacon collocation S600, which functions to determine that the beacons are physically located within a predetermined distance of each other and/or define a beacon cluster (examples shown in FIGS. 2, 3, and 6). The predetermined distance can be within 1 inch, 2 inches, 5 inches, 10 inches, a protocol-limited distance (e.g., the transmission distance for a given protocol), or be any other suitable distance. Beacon collocation determination can function as a trigger event, function to select the beacons within a cluster, or be otherwise used. Beacon collocation (e.g., cluster membership) can be defined virtually (e.g., wherein the respective beacon IDs are associated with a cluster), physically (e.g., wherein collocated beacons form a cluster), or otherwise determined. Beacon collocation can be determined based on images of the beacons (e.g., recorded by a user device camera), based on the receipt and/or signal strength of short-range protocol signals (e.g., NFC, BLE), based on known or estimated physical beacon locations (e.g., determined through trilateration with known physical reference points, such as old beacons), or otherwise determined.

In one embodiment, beacon collocation is determined by the beacon in response to beacon receipt of signals, broadcast by a second beacon (e.g., old beacon). In this variation, beacons can optionally be considered collocated when the signal strength of the received signal exceeds a threshold signal strength (e.g., determined by the manufacturer or user; calculated based on the broadcast power in the settings; etc.). In a second embodiment, determining beacon collocation with the beacon includes detecting physical connection to a second beacon (e.g., through force sensors in the housing, induction, wired connection, etc.). In a third embodiment, determining beacon collocation includes receiving signals, broadcast by a set of beacons, at a user device within a predetermined amount of time (e.g., substantially concurrently, within a timeframe selected based on the beacons' advertising interval, within a predetermined timeframe, etc.) and/or while the user device is substantially static (examples shown in FIGS. 9, 11, 12, 13, 14, and 15). Determining that the user device is substantially static can include: determining that the user device is located within a predetermined physical region; determining that the user device is moving less than a threshold amount, as determined based on on-board orientation sensors; determining that the user device is moving less than a threshold amount between measurements; determining that sequential RSSI measurements by the user device for the same beacon signal varies below a threshold variance; recording beacon signals from multiple beacons within a small time frame, wherein the time frame is long enough to encompass an advertising cycle but shorter than a user walking or movement speed; determining that the user device motion falls below a threshold value; or be otherwise determined. In a fourth embodiment, determining beacon collocation includes determining physical locations for a set of beacons (e.g., through trilateration from a plurality of user devices with known physical locations, through user-assigned labels or tags, etc.) and automatically associating beacons located within a predetermined physical region (e.g., geofence) in a cluster.

Figure 10:
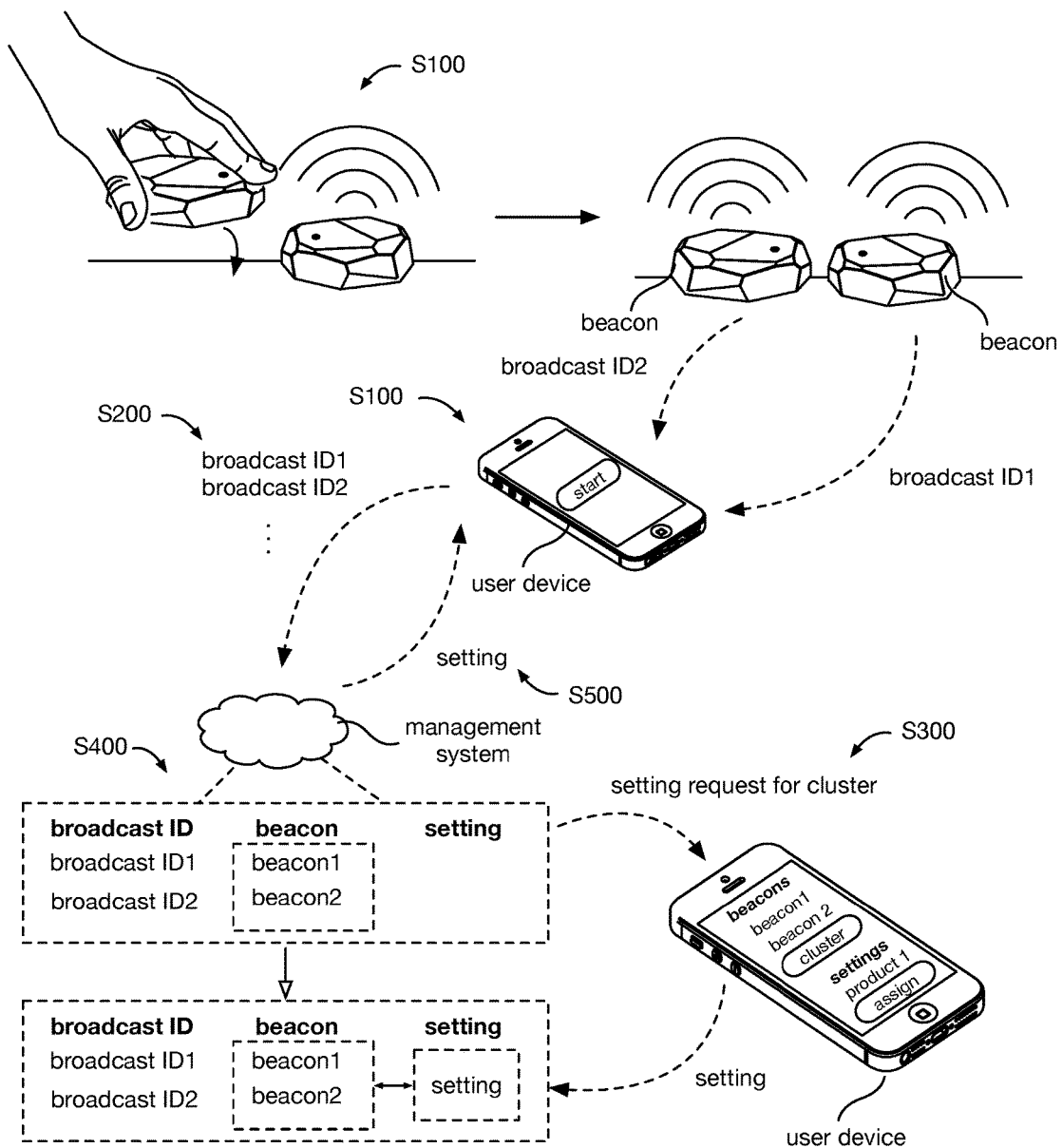
FIG. 10 is a schematic representation of a third variation the method, including detecting a trigger event, listening for beacon identifiers, and assigning settings based on the received identifiers in the management system.
Figure 11:
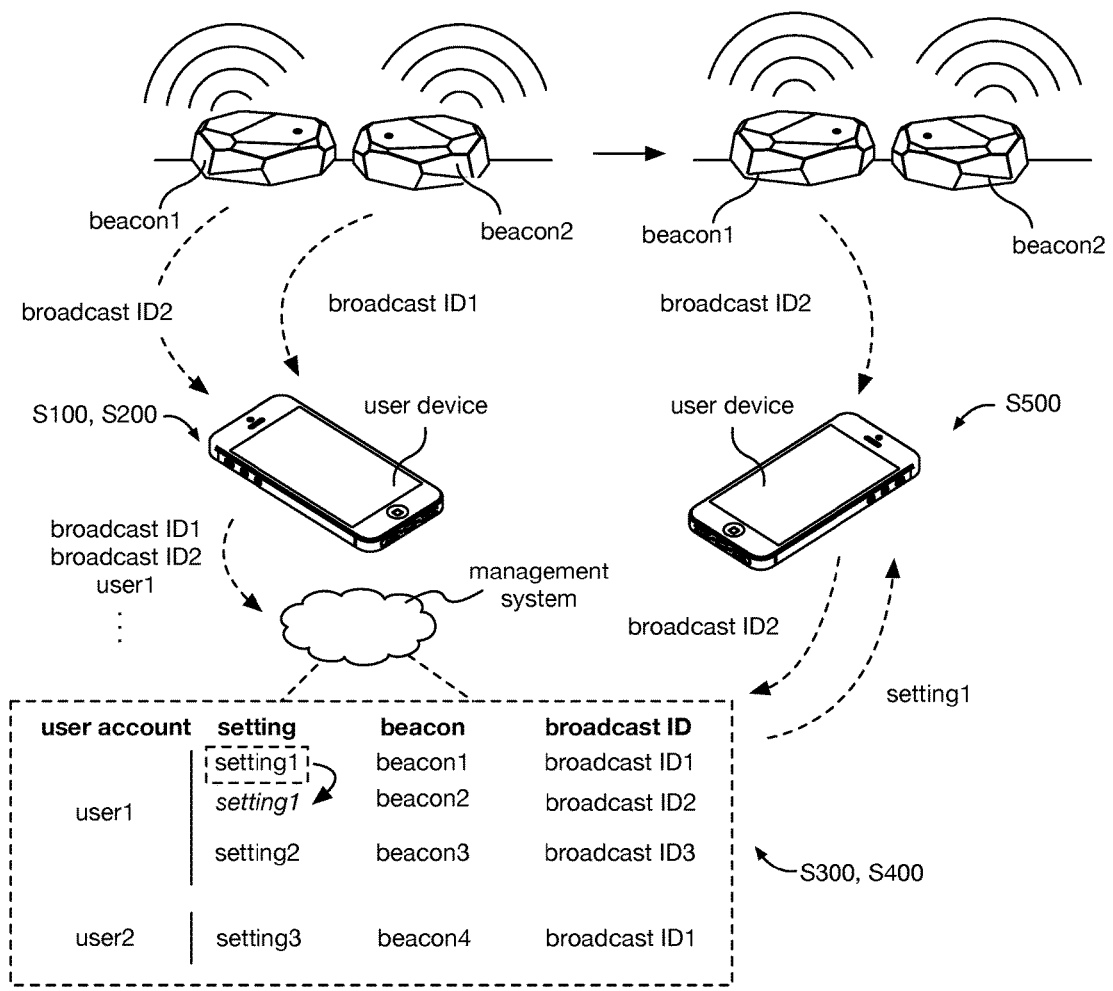
FIG. 11 is a schematic representation of a fourth variation of the method, including detecting a trigger event, listening for beacon identifiers, assigning settings based on the received identifiers in the management system, and operating the beacons based on the settings, including returning re-assigned returned information.
Figure 12:
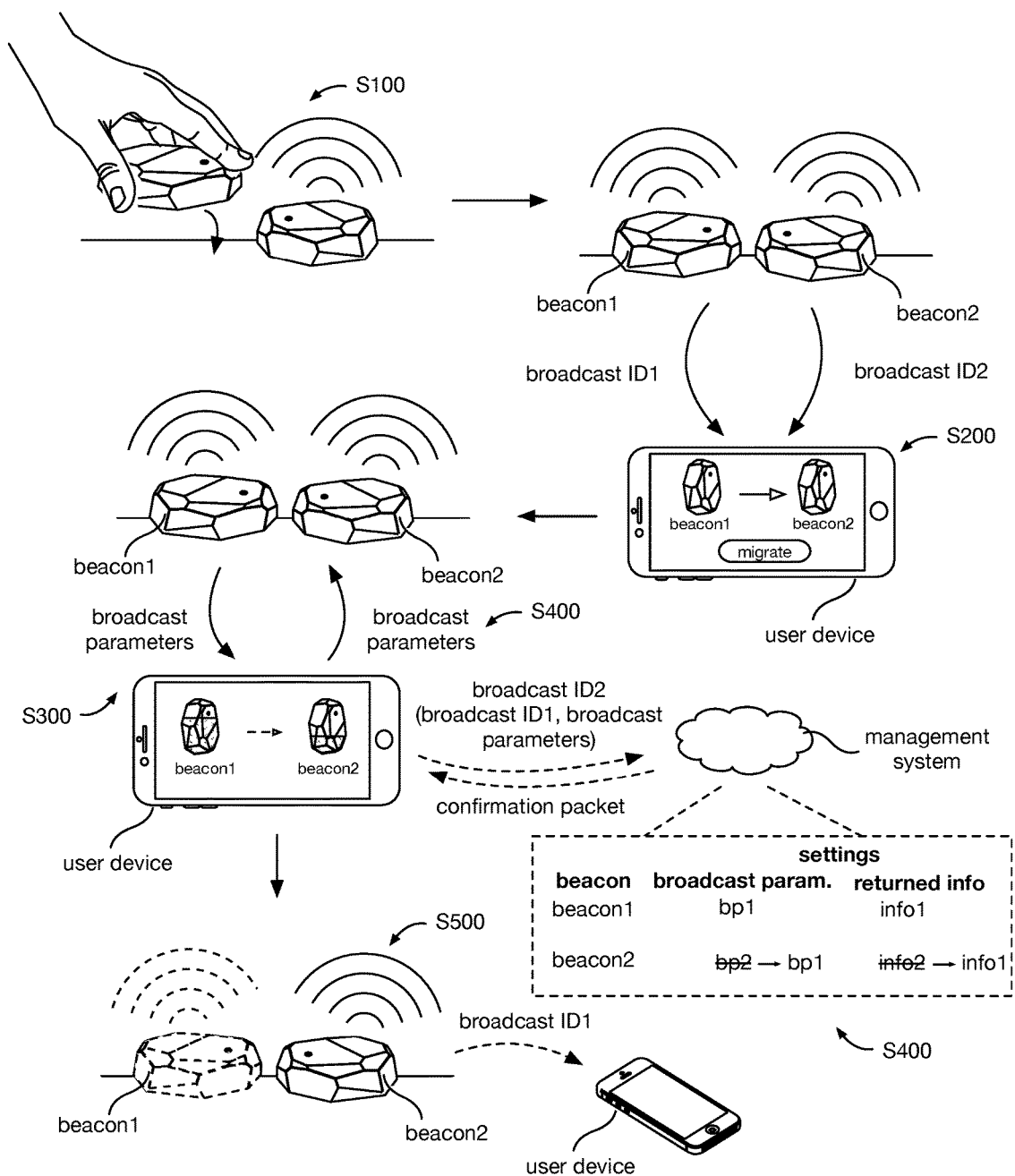
FIG. 12 is a schematic representation of an example of setting migration from an old beacon to a new beacon.

In a second variation, the cluster membership is defined by a user (example shown in FIG. 10). In one example, beacon representations (e.g., graphical representations, icons, etc.) of candidate beacons (e.g., beacons from which signals are received by the user device, beacons associated with the user account, etc.) can be displayed on the user device, and the user can select the beacons to be clustered (e.g., virtually grouped in the remote computing system). In a second example, the cluster membership includes all beacons that have received a predetermined input pattern (e.g., tapping pattern, audio pattern, light pattern, etc.).

In a third variation, the cluster membership can be automatically determined. The cluster membership can be automatically determined based on the respective beacon settings (e.g., broadcast identifier, advertising interval, etc.), based on the associated user account, or determined based on any other suitable variable. In one example, beacons are clustered based on broadcast parameters. In a specific example, new beacons (e.g., beacons from which a default broadcast identifier are received) are included in a cluster. In a second example, unconfigured beacons (e.g., beacons without configured settings stored in the management system) are included in a cluster. In a third example, configured beacons are included in a cluster. However, any other suitable beacon can be included in the cluster in any other suitable manner.

4.3 Setting Determination.

Determining the settings S300 functions to determine the beacon setting values for each beacon within the cluster. The settings can be determined by the user, the beacon(s), the user device, the remote computing system, or by any other suitable system. The settings can be received (e.g., retrieved from a beacon, device, remote computing system, etc; entered at a user device), calculated, extracted, determined using machine learning techniques, iteratively determined, selected (e.g., from a predetermined chart or graph), learned (e.g., using historic beacon operation data; similar beacon operation data or settings; etc.), or otherwise determined. The settings can be determined before, concurrently or after trigger event occurrence, beacon set determination, or at any other suitable time.

The determined beacon settings can include all setting variables, a subset of setting variables (e.g., only the broadcast identifier; only the broadcast parameters; subsets of the broadcast parameters, such as the broadcast identifier and advertising interval; only the returned information, such as the returned location or URI; only variables affecting the broadcast frame; etc.), or include any other suitable set of settings.

In a first variation (e.g., setting migration), the determined beacon settings include the settings for a second beacon (examples shown in FIGS. 2, 3, 7, 8, 11, and 12). The second beacon is preferably a configured beacon (e.g., old beacon), but can be any other suitable beacon. The second beacon can be within the beacon set identified in S200 or be outside the set. In this variation, S300 can include identifying the beacon to be replicated (e.g., cloned), and determining the settings for the identified beacon. The beacon to be replicated can be: user identified (e.g., selected from a list of proximal beacons), automatically identified (e.g., be a beacon identified by a received, be the configured beacon within a cluster, be the beacon with a battery SOC or voltage less than a threshold SOC or voltage), or otherwise identified. The identified beacon's settings can be determined by: retrieving the settings from the beacon itself (e.g., connecting to the beacon and retrieving or requesting the beacon settings from storage on-board the beacon), retrieving the settings from a remote computing system (e.g., transmitting the beacon's broadcast identifier or frame to the remote computing system, wherein the remote computing system returns beacon settings associated with the beacon's broadcast identifier), or otherwise determining the beacon settings.

Figure 15:
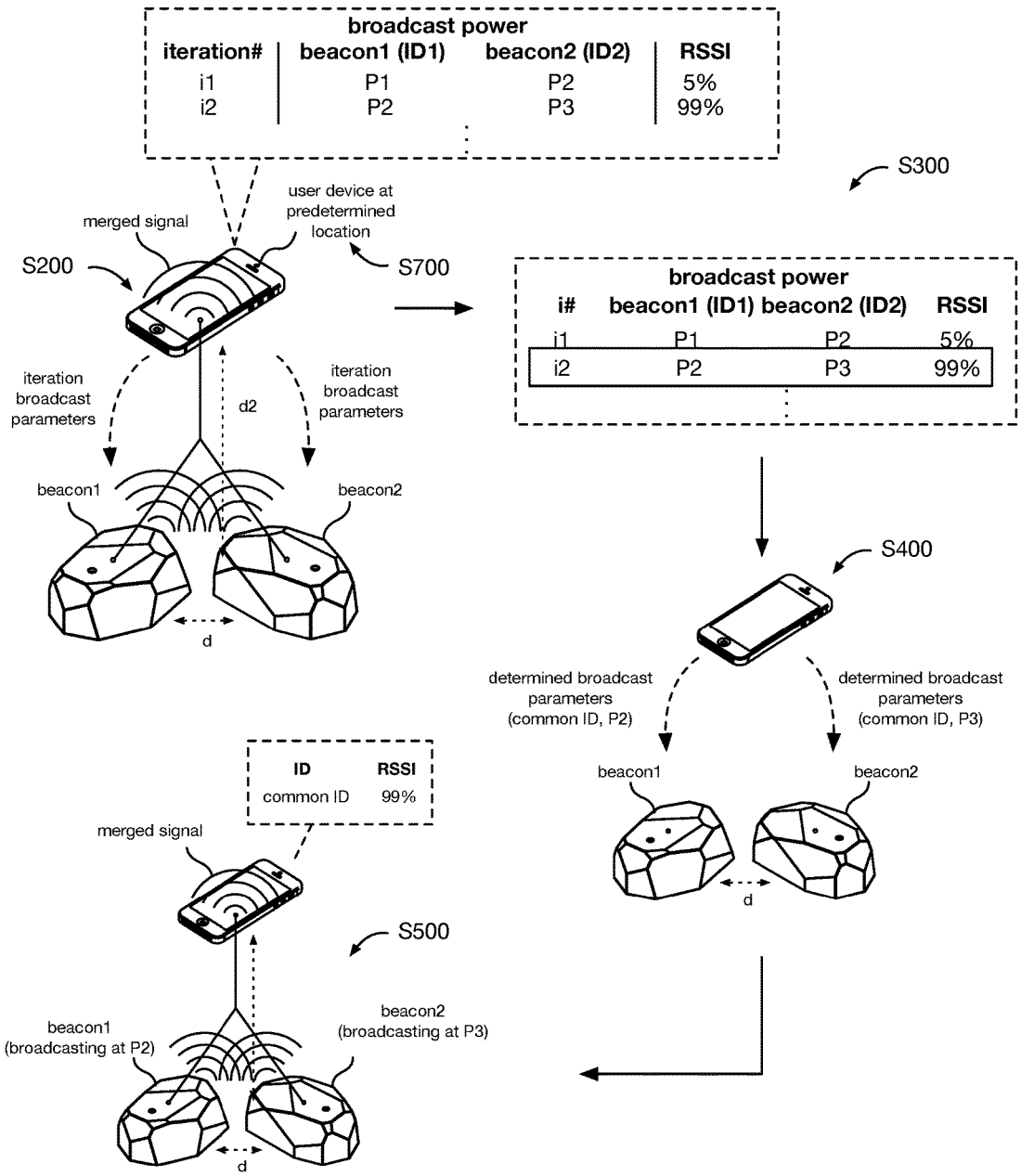
FIG. 15 is a schematic representation of a specific example of determining the broadcast parameters for each beacon to achieve a target signal parameter (e.g., signal strength) at a given location while minimizing broadcast parameters for each beacon in the cluster.
Figure 16:
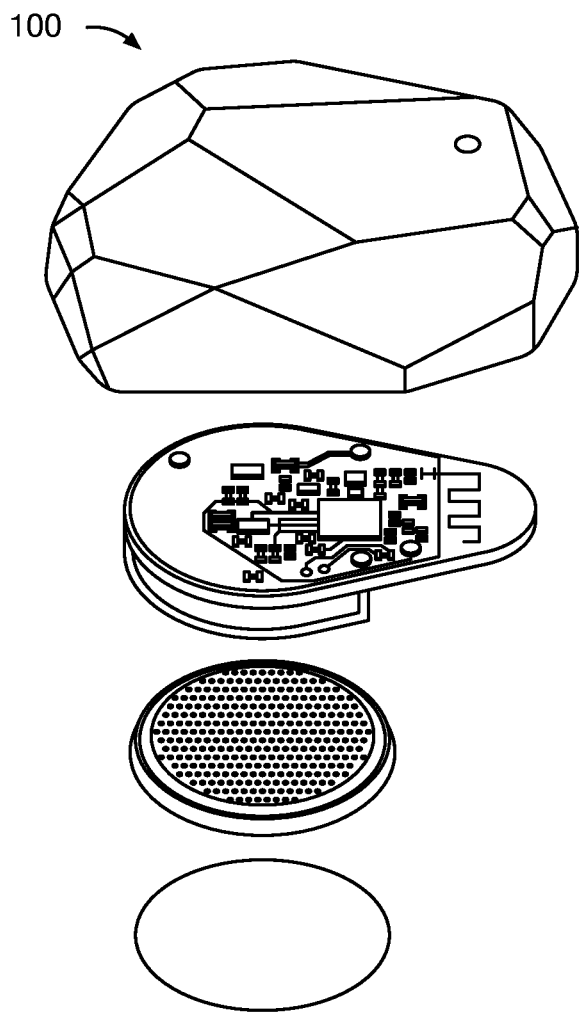
FIG. 16 is an exploded view of a variation of the beacon.

In a second variation, the determined beacon settings include setting values that satisfy a target parameter, wherein the method can additionally include determining a target parameter S700 (example shown in FIG. 15). The target parameter is preferably a cluster operation parameter, but can alternatively be a setting variable for an individual beacon (e.g., broadcasting parameter variables) or be any other suitable parameter. The cluster operation parameter preferably characterizes the operation of a cluster of beacons, operating cooperatively as a whole. Cluster operation parameters can include and/or be the cluster equivalent of: beacon broadcast parameters, beacon operation parameters, or other individual beacon variables, or be any other suitable variable. For example, cluster operation parameters can include a target advertising schedule (e.g., interval), target broadcast power for a given physical location, or common broadcasting identifier. The target parameter can be user-determined (e.g., received at a user device), automatically determined (e.g., be a default value; calculated, such as to optimize or maximize the collective cluster lifetime, based on the individual beacons' telemetry data; be a learned value; determined based on contextual data, the beacon use case, or other variables; etc.), or be otherwise determined. The target parameter can be determined by the user device, beacon, beacon cluster (e.g., crowdsourced), management system, or by any other suitable system.

The setting values can be determined for individual beacons within the cluster, for the cluster as a whole, or for any suitable set of beacons. The individual beacon settings (determined based on the target parameter) can be the same for each beacon within the beacon cluster, be different for each beacon within the cluster (e.g., have the same broadcasting identifier, advertising interval, and broadcasting power, but different advertising times; have the same broadcasting identifier, and different broadcasting power, advertising intervals, and advertising times; etc.), or be otherwise related within the cluster.

The setting values can be determined based on: the target parameter value, the number of beacons in the cluster (e.g., beacon plurality), the beacon telemetry values (e.g., SOC), the spatial distribution of the beacons, the transmission wavelength, or based on any other suitable variable. The setting values can be determined by: calculating the setting value (e.g., using an optimization equation), iteratively determining the setting variable value (e.g., picking an advertising frequency for each beacon and adjusting the frequency when an operation parameter, such as SOC, changes beyond a predetermined threshold; picking a set of setting values for each beacon, monitoring the parameter, adjusting one or more of the setting values until the parameter value meets the target parameter value; etc.), or otherwise determining the setting values.

In a first embodiment, the target parameter includes a common identifier, wherein all beacons within the cluster broadcast the common identifier (common broadcast identifier), examples shown in FIGS. 9 and 12-14. The common identifier can be mapped to the same or different manufacturer identifier, returned information, or other information for each beacon. The beacons within the cluster can optionally broadcast secondary identifiers different from the common identifier (e.g., off-schedule, concurrent with common identifier broadcast, etc.), wherein the secondary identifiers can map to the same or different information as the common identifier. The common identifier can be: the broadcast identifier for a beacon (e.g., a configured beacon, a beacon within the cluster, a user-selected beacon, etc.), a user-entered broadcast identifier (e.g., at a native application, browser, etc.; in association with a beacon of the cluster or the cluster itself), or be determined in any other suitable manner.

The common identifier can be static or dynamic (e.g., rotate or change over time). In the latter case, the broadcast identifiers are preferably coordinated amongst the beacons in the cluster to cooperatively broadcast the dynamic identifier. In one variation, coordinating broadcast beacon identifiers includes assigning each beacon one or more different broadcast identifiers (e.g., based on a predetermined cycle of broadcast identifiers), such that the cluster collectively broadcasts the dynamic identifier as the broadcasting task rotates through each beacon in the cluster. In this variation, the advertising order can additionally be determined based on the predetermined cycle. In a second variation, coordinating broadcast beacon identifiers includes assigning the same set of dynamic identifier generation rules to each beacon of the plurality and synchronizing the beacons (e.g., using the intermediary device's clock, a GPS clock, etc.), such that each beacon generates the respective dynamic identifier for a given timestamp based on the synchronized clocks at the respective advertising time. However, the broadcast identifiers can be otherwise coordinated amongst the beacons in a cluster.

Figure 13:
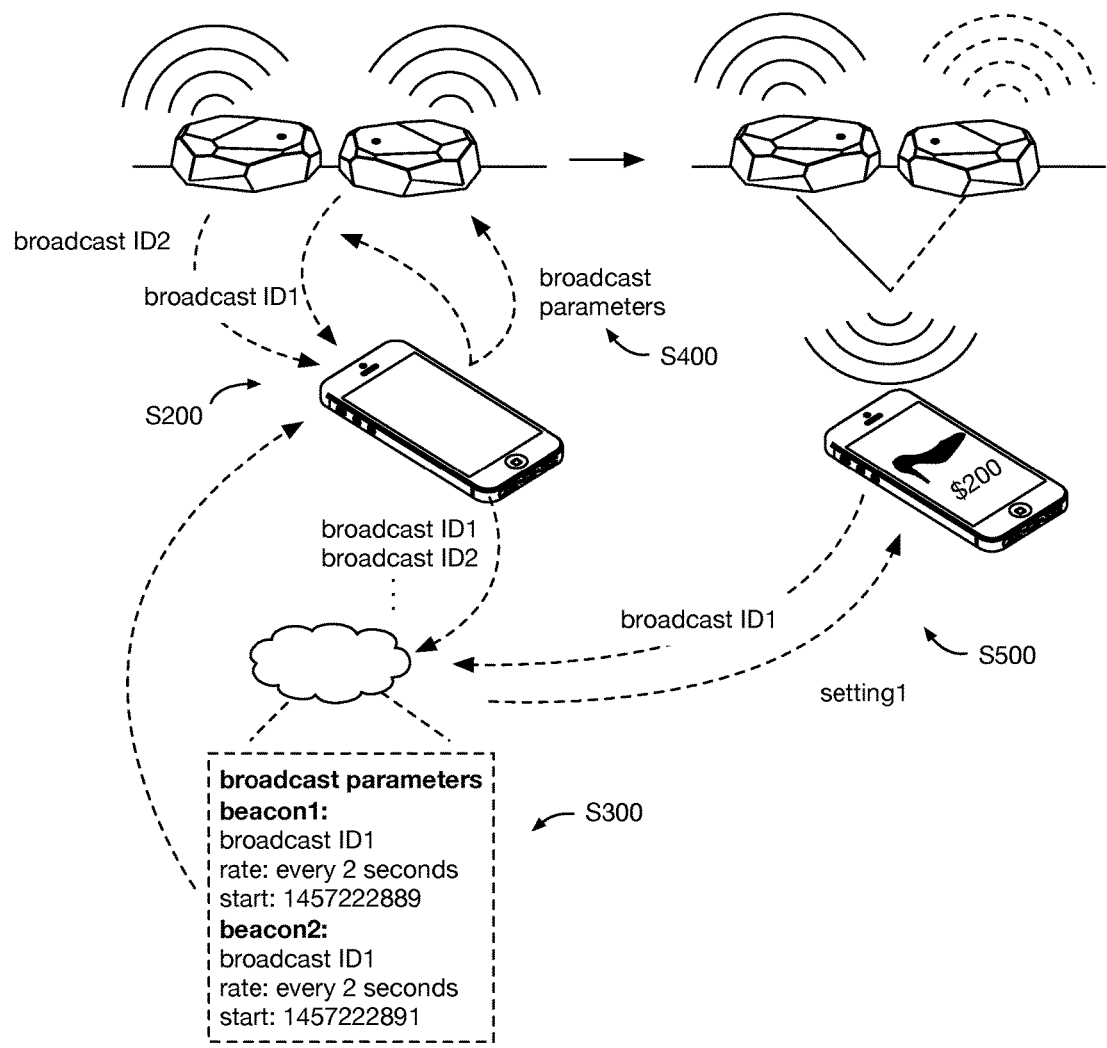
FIG. 13 is a schematic representation of a specific example of determining broadcast parameters for each beacon to alternate broadcasting amongst the beacons within the cluster, transferring the broadcast parameters to the beacons, and operating the beacons based on the broadcast parameters.
Figure 14:
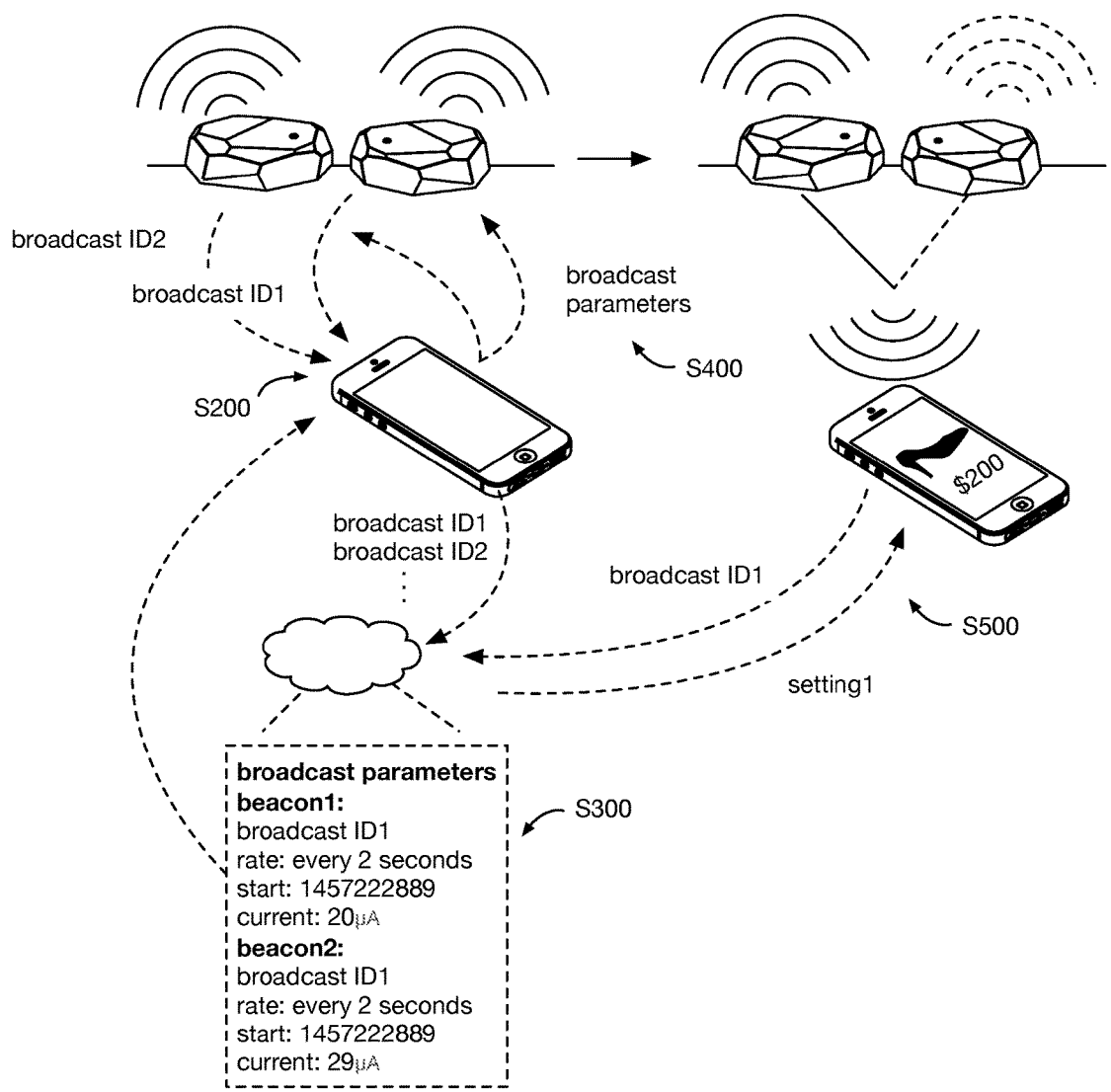
FIG. 14 is a schematic representation of a specific example of determining broadcast parameters for each beacon to minimize power consumption per broadcast, transferring the broadcast parameters to the beacons, and operating the beacons based on the broadcast parameters.

In a second embodiment, the target parameter includes a target advertisement frequency, wherein the beacon cluster cooperatively broadcast an identifier at the advertisement frequency (e.g., operate in the serial broadcasting mode), example shown in FIG. 13. In this embodiment, S300 includes determining an advertisement interval and/or an advertising time for each beacon within the cluster, such that when each beacon broadcasts at the respective advertisement interval and advertising time, the cluster cooperatively simulates a single beacon broadcasting at the target advertisement frequency. The beacons in the cluster can broadcast serially, concurrently, or be otherwise coordinated.

Determining the advertisement interval (or frequency) for each beacon within a cluster functions to determine how frequently each beacon needs to broadcast signals, which functions to extend the lifetime of each beacon within the cluster (e.g., as compared to a single beacon broadcasting at the target advertising frequency). In a first variation, determining the advertisement interval for each beacon includes dividing the target advertising frequency by the number of beacons in the cluster (e.g., number of beacons concurrently connected to a user device; etc.). In a second variation, the advertisement interval for each beacon is determined by allocating the advertising events to individual beacons based on the respective beacon's SOC or battery voltage. For example, beacons with higher SOCs can broadcast more frequently than beacons with lower SOCs. However, the advertisement interval can be otherwise determined.

Determining the advertisement time for each beacon within a cluster functions to coordinate signal broadcasting within the beacon cluster. The advertisement time can be a global time (e.g., GPS time), a relative time (e.g., time from beacon or cluster startup), or be any other suitable time. The advertisement time can be an initial reference time (e.g., first advertisement time for the cluster), an initial advertising time for each beacon (e.g., wherein the initial advertising times for sequentially advertising beacons are staggered by the prior or subsequent beacon's advertisement interval), an advertising schedule for each beacon, or be any other suitable advertisement time. The advertisement time can be determined based on the target advertising frequency and each beacon's respective advertising interval, or be otherwise determined. In one variation, the advertisement time can be determined by the beacon itself, wherein a first beacon: operates in a master mode, determines when second beacon last advertised the desired information (e.g., retrieved from second beacon, records the timestamp of second beacon frame receipt by the first beacon), and automatically determines the advertising time for the first beacon based on first beacon's advertisement interval and target advertisement frequency.

In a third embodiment, the target parameter includes a target signal strength for a predetermined location (example shown in FIG. 15). In this variation, the signals broadcast by the beacons in the cluster preferably cooperatively generate a total signal at the predetermined location having the target signal strength (e.g., the signals constructively interfere at the location to generate the total signal; the beacons operate in the concurrent broadcasting mode). This variation can function to: decrease each beacon's individual broadcasting power (e.g., relative to the broadcasting power required to achieve target signal strength at the location for a single beacon); increase the cluster's broadcasting range (e.g., relative to an individual beacon's broadcasting range), target specific locations while excluding other locations (e.g., through constructive interference at the included locations and destructive interference at the excluded locations; through beamforming; etc.), or perform any other suitable functionality or achieve any other suitable result.

The target signal strength can be the default signal strength for the predetermined location (e.g., the signal strength from a single beacon), be received from a user, be determined from the target broadcasting power for each beacon (e.g., received from a user, determined from an optimization or cost-function analysis, etc.), or otherwise determined. The predetermined location can be a user device location, a user-specified region, a predefined region proximal the beacon cluster (e.g., 1 m radius about the beacon cluster, arbitrarily defined region, etc.), or be any other suitable location.

Determining setting values (e.g., broadcast parameters) to meet the target signal strength for a predetermined location can include determining the broadcast parameters for each beacon, wherein the broadcast parameters for each beacon include the broadcasting power and the broadcasting schedule. However, the setting values can be otherwise determined. The broadcasting power for each beacon is preferably lower than a reference broadcasting power associated with the target signal strength at the physical location for a single beacon, but can alternatively be the default broadcasting power, a higher broadcasting power, or be any other suitable broadcasting power. Each beacon can be on the same (e.g., synchronized) broadcasting schedule, with the same advertising time and interval; be on different broadcasting schedules (e.g., wherein broadcasting from beacons closer to the location are delayed relative to broadcasting from beacons further from the location such that the signals arrive at the location at the same time); or be on any other suitable schedule.

In a first variation of determining the setting values to meet the target signal strength, the broadcast parameters are specified by a user. In a second variation, the broadcast parameters are selected (e.g., based on the number of beacons in the cluster). In a third variation, the broadcast parameters for each beacon are calculated. In a first embodiment, calculating the broadcast parameters includes determining the broadcasting power required to achieve the target signal strength at the location, and dividing the broadcasting power by the number of beacons in the cluster. In a second embodiment, calculating the broadcast parameters includes calculating the broadcasting power for each beacon based on the respective beacon's telemetry data, such as battery SOC (e.g., using an optimization function, etc.). In a third embodiment, calculating the broadcast parameters includes calculating the respective broadcasting power and schedule for each beacon in the cluster based on the respective beacon's position relative to the remainder of the cluster and/or location. However, the broadcast parameters can be otherwise calculated. In a fourth variation, the broadcast parameters are empirically determined. In a first embodiment, empirically determining the broadcast parameters includes using beamforming techniques (e.g., measuring signal reflections) to achieve the target signal strength at the location. In a second embodiment, empirically determining the broadcast parameters includes: at a user device located at the physical location, connecting to each beacon of the plurality; and while the user device is connected to each beacon of the plurality, iteratively adjusting the respective broadcast parameters for each beacon of the plurality until a target condition is met (example shown in FIG. 15). Target condition monitoring and/or broadcasting parameter adjustment are preferably performed while the user device is substantially static, but can be performed while the user device is in motion. The target condition can be a total received signal strength, measured at the user device (e.g., RSSI), falling within a predetermined range of the target signal strength (e.g., within 5% of the target signal strength, etc.); be the broadcasting power for each beacon falling below a reference broadcasting power associated with the target signal strength for a single beacon; or be any other suitable target condition. The broadcasting parameter adjustment can be controlled by user device (e.g., wherein the user device iteratively determines a new parameter value and controls beacon to operate at said value), automatically controlled by beacon (e.g., according to a schedule, wherein the user device determines which combination is optimal based on a monitored variable, such as RSSI), or otherwise controlled.

4.3 Setting Assignment.

Assigning the settings to the beacon S400 functions to migrate, replicate (e.g., clone), set, or otherwise associate settings with the recipient beacon(s). The settings are preferably assigned in response to occurrence of the trigger event, after setting determination, but can alternatively be assigned at any other suitable time. The settings can be automatically assigned, pseudo-manually assigned (e.g., wherein the user specifies the settings and/or endpoints), or otherwise assigned. The settings can be settings determined using S300 above, settings stored by the management system or beacon (e.g., in association with the first beacon identifier, with a user account, with a physical location associated with the first beacon identifier, etc.), settings received from a user (e.g., from a user device), automatically determined settings (e.g., automatically generated based on beacon association with a context, product, etc.), or otherwise determined settings. The settings can be assigned by the management system (e.g., based on the identifiers for the source and/or recipient beacons), by the user device (e.g., the same or different user device that determined the trigger event; wherein the user device stores, retrieves, or receives the settings from a source beacon or management system and sends or assigns the settings to the recipient beacon), by a recipient beacon (e.g., wherein the recipient beacon requests the settings from the source beacon, such as when the beacons store the settings), by a source beacon (e.g., wherein the source beacon sends the settings to the recipient beacon), or by any other suitable device. The settings can be assigned remotely (e.g., wherein the settings are stored in association with the recipient beacon identifier by the management system; examples shown in FIGS. 3, 8, 10, 11, 12, 13, and 14), locally (e.g., wherein the settings are stored in on-board beacon storage; examples shown in FIGS. 2, 7, 9, 12, 13, 14, and 15), or otherwise stored. The management system preferably functions as the setting repository or source of truth (e.g., controls when there is a conflict between local and remote settings; wherein all beacon setting adjustment is controlled through the management system; etc.), but a master beacon, the beacon itself (e.g., the management system functions as a setting backup), the user device, or any other suitable system can function as the source of truth. Alternatively, the system can have no source of truth (e.g., the management system and beacon may have different copies of the settings, where neither controls).

Setting assignment is preferably controlled by the user device, but can alternatively be controlled by the beacon(s) (e.g., operating in master mode, using a long-range communication system, etc.), management system, or other system. Setting assignment can include: receiving frames from the beacons at the user device, receiving the settings from the setting repository at a user device, and transmitting the settings to the respective beacon(s) from the user device. The user device can function as the setting repository (e.g., calculates the setting values) or function as an intermediary.

In a first variation, the frames include source beacon frames and the recipient beacon frames, and the setting repository is the source beacon. In this variation, the user device connects to the source beacon, retrieves the beacon settings from the source beacon (e.g., in response to receipt of a "migrate" icon selection), connects to the recipient beacon (e.g., concurrently or after source beacon connection), and transmits the settings to the recipient beacon, where the recipient beacon stores the settings in on-board storage. The user device can optionally transmit the retrieved settings, source beacon identifier, and/or recipient beacon identifier to the management system, which can associate the source beacon information (e.g., transmitted settings, source beacon settings stored in the management system, source beacon identifier, etc.) with the recipient beacon. Setting transmission to the recipient beacon can be performed independently of management system logging, after the management system has stored the settings in association with the recipient beacon identifier (e.g., in response to receipt of a confirmation packet, which can include a go-ahead instruction, the settings, or any other suitable information), or at any other suitable time.

In a second variation, the frames include recipient beacon frames and the setting repository is the management system. In this variation, the user device receives the recipient beacon frames and transmits the frame and/or recipient beacon identifier to the management system. The management system determines the settings for the frames (e.g., using S200, retrieving pre-stored settings for an identified beacon, retrieving settings from a source beacon, receiving settings from a user device, etc.), and associates the settings with the recipient beacon identifier. The management system can optionally return the determined settings to the user device, wherein the user device transmits the settings to the recipient beacon frames.

In a first example, the setting values (e.g., broadcast parameter values) are directly retrieved by a recipient beacon from a source beacon and stored by the recipient beacon. In a second example, the setting values are retrieved by a user device from the source beacon and directly transferred by the user device to the recipient beacon. In a third example, the setting values are retrieved by a user device from the source beacon and transmitted by the user device to the management system (e.g., with the recipient beacon identifier), wherein the management system stores the received settings with the recipient beacon identifier and transmits a confirmation packet (e.g., with the settings, with instructions to transfer) to the user device. The user device then transfers the settings (e.g., from the packet, from the source beacon) to the recipient beacon upon confirmation packet receipt. In a fourth example, a first and second frame are received from the source and recipient beacon, respectively, at the user device. The user device transfers the source and recipient beacon frames and/or identifiers (extracted from the frames) to the management system, which associates settings (e.g., broadcast parameter values, tags, returned information, etc.), associated with the source beacon identifier, with the recipient beacon identifier. The management system can optionally transmit a confirmation packet to the user device, which can respond in a similar manner to the third example. In a fifth example, the user device receives frames broadcast by the beacons in the cluster and transmits the frames, identifiers, and/or other signal information (e.g., RSSI) to the management system. The management system determines the setting values for the individual beacons or cluster (e.g., calculates the setting values, retrieves the setting values, etc.), and transmits all or some of the determined setting values (e.g., broadcast parameters addressed to individual beacons) to the user device, which forwards the setting values to the respective beacons. In a sixth example, the beacons connect to and/or receive setting values from the management system directly (e.g., using WiFi). However, the settings can be otherwise assigned (e.g., virtually, in the management system; physically, in the beacons).

4.4 Operating the Beacon According to the Settings.

Operating the beacon according to the settings S500 functions to operate the beacon cluster in coordination. In a first variation, all beacons in the cluster broadcast a common identifier and/or frame information, according to the shared settings, wherein the management system returns the same information for a user device request including the common identifier and/or frame information (example shown in FIGS. 13-15). In a first embodiment of the first variation, the beacons serially broadcast the frame to cooperatively simulate a single beacon's broadcasting schedule. In a second embodiment of the first variation, the beacons substantially concurrently broadcast the frame to cooperatively simulate a single beacon's signal strength for a given location (examples shown in FIGS. 14 and 15). In a second variation, a new beacon broadcasts the same information as an old beacon (examples shown in FIGS. 12 and 13). In a third variation, a user request including a new beacon's identifier returns the same information as a user request including the old beacon's identifier (example shown in FIG. 1*i*). However, the beacons can be otherwise operated according to the settings.

4.5 Resetting the Source Beacon.

The method can optionally include resetting a source beacon S600, which functions to reset the source beacon to default settings and/or assign new settings to the source beacon. The source beacon can be reset before, during, and/or after setting transfer to the recipient beacon. In a first variation, a reset instruction is sent to the source beacon (e.g., by the user device, recipient beacon, management system, etc.), wherein the source beacon automatically resets upon receipt of the reset instruction. In a second variation, new settings (e.g., default settings) are transmitted to the source beacon, wherein the new settings overwrite the old settings. However, the source beacon can be otherwise reset. Resetting the source beacon can optionally include: transmitting a reset confirmation to the management system (e.g., via the user device), presenting an instruction to the user on the user device to remove the source beacon from the mounting surface, or include any other suitable process.

4.6 Beacon and/or Cluster Operation in Different Beacon Modes.

The method can optionally include operating the beacon between one or more operation modes, which functions to selectively operate the beacon using different beacon settings. The beacon operation mode can be selected based on individual beacon telemetry values, context (e.g., time of day, number of user devices within range), cluster telemetry values, or any other suitable variable. The operation mode can be user-selected, determined by a user device, the beacon itself, a remote computing system, or another computing system (e.g., using a neural network; a set of rules; a schedule; context, such as the time of day or number of user devices within range; operation parameters; etc.), or otherwise determined. In a first example, after beacon setting migration from an old beacon to a new beacon, the old and new beacons operate in the serial broadcasting mode until the old beacon is dead (e.g., the old beacon SOC falls below a threshold SOC). In a second example, the beacon cluster can operate in the concurrent broadcasting mode until a beacon in the cluster dies (e.g., the measured signal strength at the location is consistently lower than the target signal strength), wherein the system automatically re-determines and re-assigns the beacon settings for the remaining beacons in the cluster (e.g., resulting in remaining beacon operation in a new concurrent broadcasting mode, independent broadcasting mode, serial broadcasting mode, etc.). However, the system can otherwise accommodate for individual beacon loss and/or otherwise control beacon operation in different operation modes.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for beacon setting migration, comprising:
   at a first physical beacon, broadcasting a first beacon identifier according to a first set of settings;
   at a second physical beacon, broadcasting a second beacon identifier according to a second set of settings;
   at a remote computing system, receiving the first beacon identifier and the second beacon identifier;
   at the remote computing system, retrieving the first set of settings for the first physical beacon based on the first beacon identifier;
   at the remote computing system, storing the first set of settings in association with the second physical beacon;
   at the remote computing system, retrieving credentials for the second physical beacon based on the second beacon identifier;
   at the remote computing system, transmitting the credentials with the first set of settings for the second physical beacon to a user device, wherein the user device transmits the credentials and the first set of settings to the second physical beacon;
   at the second physical beacon, verifying access for setting adjustment based on the credentials;
   at the second physical beacon, receiving the first set of settings and storing the first set of settings after access verification; and
   at the second physical beacon, broadcasting the first beacon identifier according to the first set of settings after receiving the first set of settings.

2. The method of claim 1, further comprising resetting the first physical beacon to default settings.

3. The method of claim 2, wherein resetting the first physical beacon to default settings comprises:
- at the remote computing system, retrieving credentials for the first physical beacon based on the first beacon identifier;
- establishing a connection to the first physical beacon based on the credentials, comprising:
  - transmitting the credentials to the first physical beacon;
  - at the first physical beacon, verifying access for setting adjustment based on the credentials; and
- transmitting a reset instruction to the first physical beacon over the connection.

4. The method of claim 2, further comprising: replacing the first set of settings with the default settings at the remote computing system.

5. The method of claim 1, further comprising:
- at the remote computing system, storing the second set of settings in association with the second physical beacon before the first beacon identifier and the second beacon identifier are received;
- wherein storing the first set of settings in association with the second physical beacon at the remote computing system comprises: replacing the second set of settings with the first set of settings after the first beacon identifier and the second beacon identifier are received at the remote computing system.

6. The method of claim 1, further comprising:
- at a user device, receiving the first and second beacon identifiers;
- at the user device, receiving a user selection of a migration icon at the user device after receiving the first and second beacon identifiers at the user device; and
- at the user device, transmitting a migration instruction, the first beacon identifier, and the second beacon identifier to the remote computing system in response to receipt of the user selection.

7. The method of claim 1, further comprising:
- identifying the first physical beacon as a beacon to be replicated; and
- identifying the second physical beacon as a migration recipient.

8. The method of claim 7, further comprising, at a user device proximal the first and second physical beacons:
- receiving the first and second beacon identifiers from the first and second physical beacons, respectively;
- transmitting the first beacon identifier and the second beacon identifier to the remote computing system;
- receiving the first set of settings for the second physical beacon from the remote computing system; and
- transmitting the first set of settings to the second physical beacon.

9. The method of claim 8, wherein identifying the first physical beacon as the beacon to be replicated comprises receiving the first beacon identifier at the user device before detecting a trigger event.

10. The method of claim 9, wherein the trigger event comprises selection of a setting transfer icon at the user device.

11. The method of claim 9, wherein identifying the second physical beacon as a migration recipient comprises receiving the second beacon identifier at the user device after detecting the trigger event.

12. The method of claim 8, wherein the first and second identifiers are broadcast by a first and second short-range wireless radio of the first and second physical beacons, respectively.

13. The method of claim 12, wherein the first and second short-range wireless radios each comprise a Bluetooth radio.

14. The method of claim 1, further comprising, at the remote computing system:
- receiving a user account identifier with the first and second beacon identifiers, wherein the user account identifier is associated with the user device; and
- transmitting the first set of settings to the user device after verification that the user account identifier is associated with the second physical beacon, wherein the user device transmits the first set of settings to the second physical beacon.

* * * * *